(12) United States Patent
Urano et al.

(10) Patent No.: US 8,438,249 B2
(45) Date of Patent: May 7, 2013

(54) SENSOR-NET SYSTEM AND SENSOR NODE

(75) Inventors: Takehiro Urano, Hachioji (JP); Keiro Muro, Koganei (JP); Toshiyuki Odaka, Fuchu (JP); Minoru Ogushi, Kodaira (JP); Yoshihiro Wakisaka, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 434 days.

(21) Appl. No.: 12/068,704

(22) Filed: Feb. 11, 2008

(65) Prior Publication Data

US 2008/0307075 A1 Dec. 11, 2008

(30) Foreign Application Priority Data

Jun. 7, 2007 (JP) ................................. 2007-151866

(51) Int. Cl.
*H06F 15/16* (2011.01)

(52) U.S. Cl.
USPC ........... 709/220; 709/221; 709/222; 709/223; 709/224; 370/236; 370/237; 370/238

(58) Field of Classification Search .................. 709/220, 709/223, 224, 228
See application file for complete search history.

(56) References Cited

U.S. PATENT DOCUMENTS

| | | | |
|---|---|---|---|
| 7,035,240 B1* | 4/2006 | Balakrishnan et al. | 370/338 |
| 7,260,733 B2* | 8/2007 | Ichikawa et al. | 713/375 |
| 7,436,789 B2* | 10/2008 | Caliskan et al. | 370/310.1 |
| 2002/0038353 A1* | 3/2002 | Yamamoto | 709/217 |
| 2006/0048019 A1* | 3/2006 | Takahashi | 714/48 |
| 2006/0064503 A1* | 3/2006 | Brown et al. | 709/238 |
| 2007/0103298 A1* | 5/2007 | Kim et al. | 340/539.22 |
| 2007/0258508 A1* | 11/2007 | Werb et al. | 375/140 |
| 2008/0058032 A1* | 3/2008 | Yamaji et al. | 455/574 |

OTHER PUBLICATIONS

"Zigbee Protocol Overview"—2007 Zigbee Standards Organization https://docs.zigbee.org/zigbee-docs/dcn/07-5482.pdf.*
"Demo Abstract: A High-Density Earthquake Monitoring System Using Wireless Sensor Networks"—SenSys, Nov. 2006 www.mlab.t.u-tokyo.ac.jp/attachment/file/37/sensys07-makoto.pdf.*
"Overview and processing method of the Earthquake Early Warning", Japan Meteorological Agency Website, http:///www.selsvol.kishou.go.jo/eq/EEW/kentokai5/, pp. 1-12 in Japansese, and 3 pages of English translation of pp. 5-6 of the Japanese text "(2) Grid Search Method (3 to 5 point processing)".

* cited by examiner

*Primary Examiner* — Krista Zele
*Assistant Examiner* — Randy Scott
(74) *Attorney, Agent, or Firm* — Stites & Harbison, PLLC; Juan Carlos A. Marquez, Esq.; Nicolas B. Trenkle, Esq.

(57) ABSTRACT

A sensor-Net system includes sensor nodes which are in intermittent operation so as to save power by repeating activated state and inactivated state at a regular interval. Synchronization of time in the system is executed by aligning to the intermittent operation of the sensor nodes. A management server issues a setTime command for configuring the time to each gateway node at a specified interval. Each router node sets or corrects the time of it based on the time received from the gateway node and thereafter turns ON the time configuration flag for each sensor node in order to expand the setTime command to all of its sibling sensor nodes. The router node, upon reception of a polling, which is a command request, from the sensor node, obtains the time at that time, then uses the time to generate a setTime command to transmit to that sensor node.

11 Claims, 21 Drawing Sheets

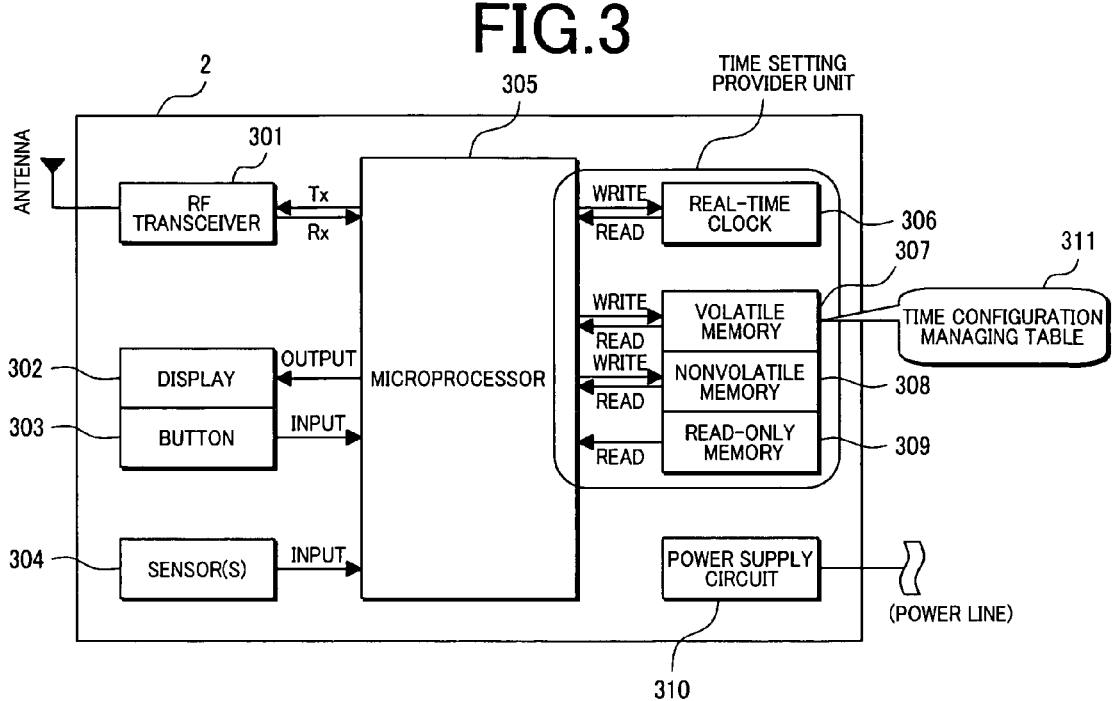
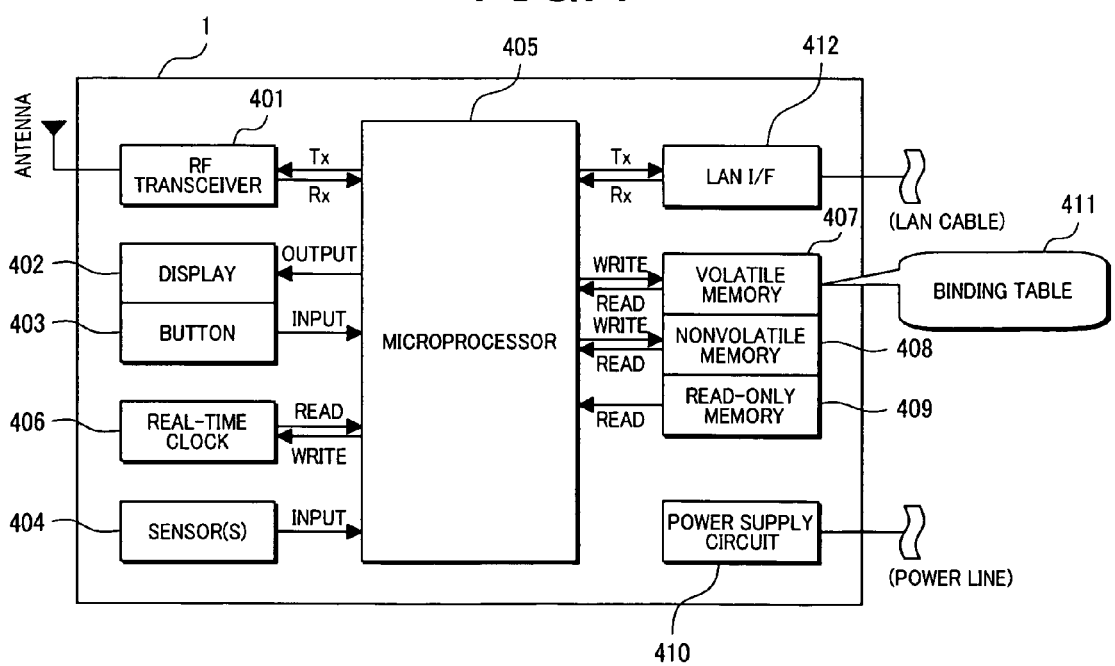

FIG.16A

BEFORE TIME CORRECTION

| SEQUENCE No. | TIME UNDETERMINED FLAG | OBSERVATION VALUE | TIME |
|---|---|---|---|
| 1 | OFF | 25°C | FEB. 16, 2007 13:45:00 |
| ⋮ | | | |
| 100 | ON | 25°C | JAN. 1, 2001 00:00:00 |
| 101 | ON | 25°C | JAN. 1, 2001 00:10:00 |
| 102 | ON | 26°C | JAN. 1, 2001 00:20:00 |

613

CALCULATION OF DIFFERENCE
↓
FEB. 16, 2007 14:20:00

AFTER TIME CORRECTION

| SEQUENCE No. | TIME UNDETERMINED FLAG | OBSERVATION VALUE | TIME |
|---|---|---|---|
| 1 | OFF | 25°C | FEB. 16, 2007 13:45:00 |
| ⋮ | | | |
| 100 | OFF | 25°C | FEB. 16, 2007 14:00:00 |
| 101 | OFF | 25°C | FEB. 16, 2007 14:10:00 |
| 102 | OFF | 26°C | FEB. 16, 2007 14:20:00 |

FIG.20
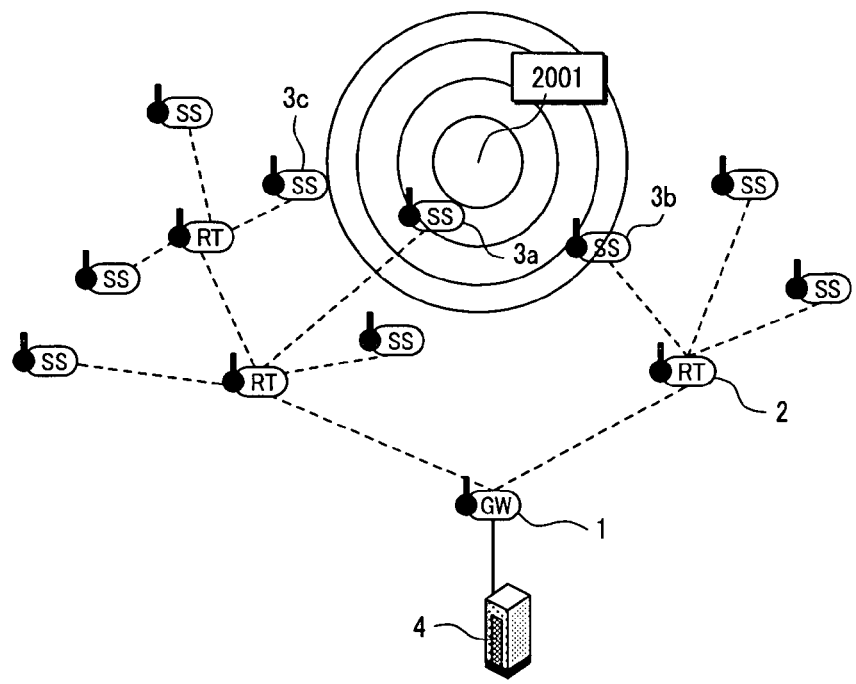
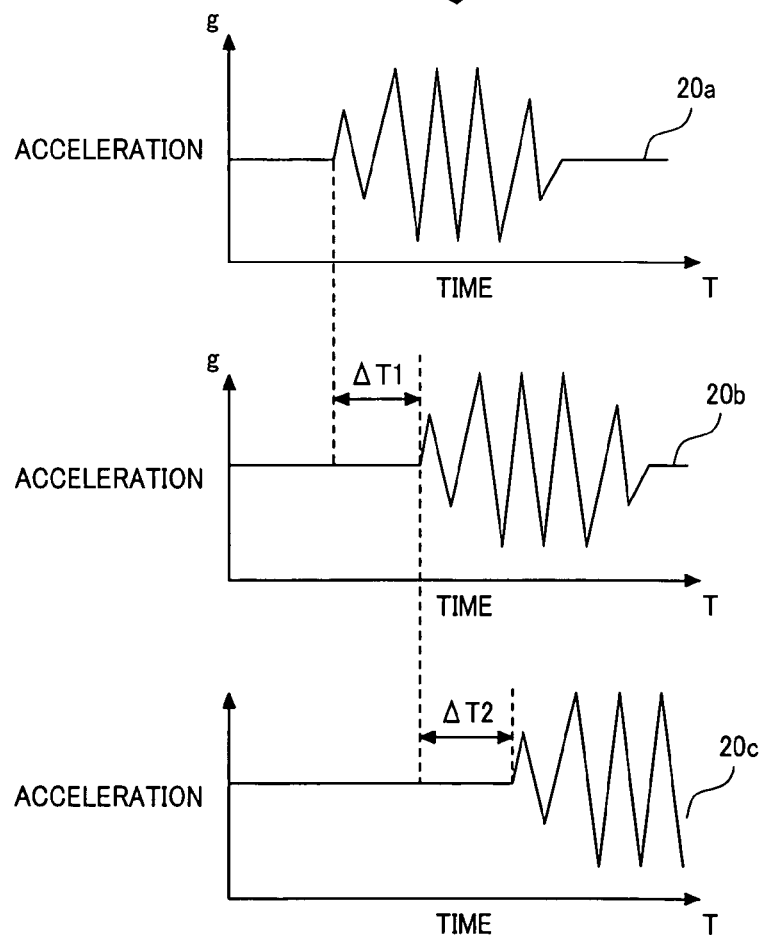

SENSOR-NET SYSTEM AND SENSOR NODE

CLAIM OF PRIORITY

The present application claims priority from Japanese application JP 2007-151866 filed on Jun. 7, 2007, the content of which is hereby incorporated by reference into this application.

BACKGROUND OF THE INVENTION

The present invention is related to a system using sensor nodes that intermittently operates so as to save power by repeating activated state and inactivated state at a regular interval, more specifically to a technology for synchronization of time in the entire system.

ZigBee is a wireless communication method used in a conventional sensor network. See ZigBee standard, published by ZigBee Alliance, on the ZigBee Alliance Website (URL: http://www.zigbee.org/) (searched on May 21, 2007).

There is also a grid search method as a method of identifying the earthquake focus. For example, see the technical document on the overview and processing method of the Earthquake Early Warning (EEW), on the Japan Meteorological Agency website (URL: http://www.seisvol.kishou.go.jp/eq/EEW/kentokai5/) (searched on May 21, 2007).

BRIEF SUMMARY OF THE INVENTION

Recently, the development of the Sensor-Net system is in progress, which incorporates miniature wireless sensor nodes (referred to as sensor nodes, herein below) which are equipped with sensor function, router nodes, a gateway node, as well as sensor-Net management server (referred to as management server, herein below). The sensor nodes may observe the state of person or location (sensor data), relay thus observed sensor data through the router node in a multi-hop manner, route the data through the gateway node to send it to the management server. The management server will perform various processes based on thus received sensor data.

The key device in the sensor-Net system is the sensor node, which is characterized by its small size and low power consumption. Because it is small the node can be attached to anything including people and environment. Because it consumes low power it can operate for a period of several years with a battery, without feeding power from an external power supply. Because it uses wireless communication, it can be deployed in a wide area via a gateway node or a router node.

The distinctive operation of the sensor node is its intermittent activation. Any necessary hardware is driven only when performing such tasks as sensing and data transmission, and when there is no task to be performed the peripheral hardware such as the radio frequency (RF) circuit will be completely stopped, and the microprocessor will be put in a sleep, low power mode. By the intermittent operation, the sensor node is capable of functioning for a long period of time only with a limited battery power.

After the microprocessor expires its predetermined sleep period, a timer generates an interrupt to reactivate the microprocessor to the normal operation mode. Then, followed by a predetermined procedure, the microprocessor executes the sensing, transmits thus sensed data, and receives any data for it by polling to process the data. If there are no more tasks to execute, the node reenters into the sleep mode for a predetermined period of time. The duration of task processing period between two sleep periods should be tens milliseconds to one second at maximum, therefore the sensor node is put into the sleep state in almost all of its life.

The fundamental characteristics of the intermittent operation are to "put into sleep mode when there is no task to be performed". The implementation of intermittent operation may include a variety of methods according to the task scheduling scheme. For example, if a sensor node incorporates plural sensors, then a unique sensing interval for each of sensors may be implemented. Since the sensing, the data transmission, and the data reception are fundamentally independent tasks, an independent operation interval may be set for each of tasks.

One method of receiving commands from a management server in a sensor node which intermittently activates and deactivates, is the polling method, in which the sender is asked for any command to that node in a regular basis. In this case no command is arrived at the sensor node unless the sensor node itself executes the polling. The sensor node is allowed to operate in accordance with its intermittent interval. In case of ZigBee, the wireless communication method used in the sensor network (see non-patent reference document #1), the required time from the query packet transmission at the time of polling to the reception of response thereto may be approximately tens milliseconds, so that the increase of power consumption associated with the implementation of polling when there is no data will be minute.

The intermittent operation method as have been described above is indispensable technology for the low power, long life operation of the sensor node. However this may cause a disadvantage. The sensor node has to continue sensing even when no data is reached to the management server by any reason, because the wireless communication is temporarily intercepted or because the transmission is disabled by the more specifically being shut-down, and the observation time is required even in this case. If there is some delay on the communication route, there may be a case in which the observation time is not matched with the reception time by the management server. To determine accurately the sensed time, it is ideal for a sensor node to provide the observation time. To do so the sensor node should have a clock, and the clock is accurately synchronized with the reference time. However, in case in which there are a plurality of sensor nodes, the time may be set by a command, ideally. Because the sensor node intermittently operates, the command may not be accepted anytime. It may be possible that the management server issues a command at the time that the sensor node executes the polling, but the energy efficiency in the sensor node is worse because the sensor node must wait for receiving the response from the management server and is required to be activated for a long period of time.

The present invention overcomes the problems in the conventional intermittent operation scheme and the object of the present invention is to provide a sensor-Net system which uses an intermittent operation with better energy efficiency.

To solve the problems as described above, in accordance with the present invention, when setting time on the clocks of the gateway node, the router node, and the sensor nodes, the router node obtains the current time at the time when the router node is requested to send a command by the sensor node, then issues a time setting command to set time in the sensor node that has issued the command transmission request.

In the sensor-Net system in accordance with the present invention the router node has a time configuration flag corresponding to each of all sensor nodes, the router node sets time by receiving the time setting command from the gateway node, turning on the time configuration flag at the time when the clock in the router node is set, then confirming the state of the time configuration flag when it receives a command transmission request from a sensor node, transmitting the time setting command only when the flag is ON, thereafter turning OFF the time configuration flag at the time when it receives the response to the time setting command.

The sensor-Net system in accordance with the present invention is a system in which the gateway node has plural router nodes and plural sensor nodes as siblings, and has a management table for managing these sibling nodes. The gateway node synchronizes the router nodes by sending from the management server to the gateway node a time setting command, by expanding the time setting command immediately to its sibling router nodes by referring the management table.

In the sensor-Net system in accordance with the present invention a sensor node issues a time setting command at the time when it is connected to the gateway node or at the regular interval, and invokes the timer at the time when it receives the time request command from the gateway node. The gateway node obtains the reference time at the time when it receives the time request command and transmits the reference time to the sensor node at the time when it receives the command request from the sensor node. The sensor node, upon reception of the reference time from the gateway node, stops the timer, and calculates the timer working time from the difference between the timer stopping time and the timer invoking time, in order to set time by adding to the reference time the timer working time.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

FIG. 3 shows a schematic block diagram illustrating the hardware arrangement in a router node in accordance with the first preferred embodiment of the present invention;

FIG. 4 shows a schematic block diagram illustrating the hardware arrangement in a gateway node in accordance with the first preferred embodiment of the present invention;

FIGS. 16A and 16B show schematic diagrams illustrating the time correction in the observation value table in the sensor node in accordance with the first preferred embodiment of the present invention;

FIG. 19 show system configuration diagrams, wherein

FIG. 20 shows a system configuration diagram of the sensor-Net system illustrating an exemplary application of the sensor-Net system using the time synchronization method in accordance with the preferred embodiment of the present invention for identifying the focus of earthquake;

DETAILED DESCRIPTION OF THE INVENTION

The detailed description of some preferred embodiments will now given which embody the present invention, referring the accompanying drawings.

Embodiment 1

Figure 1:
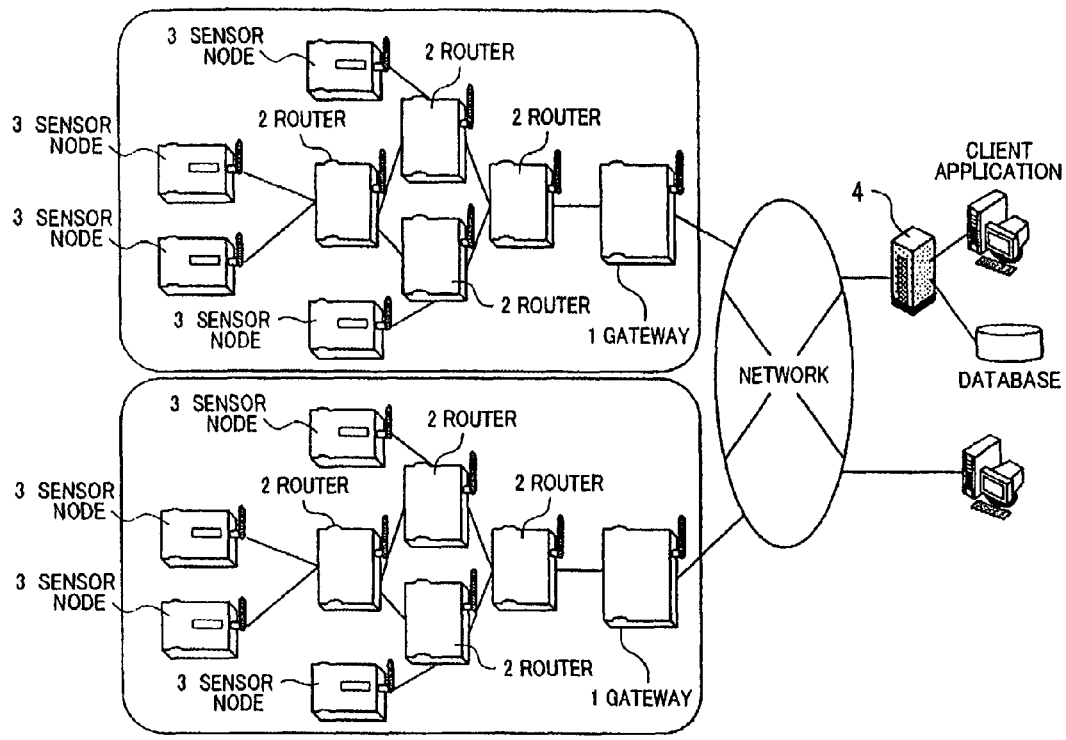
FIG. 1 shows a schematic diagram illustrating the entire system of the sensor-Net in accordance with first preferred embodiment of the present invention.

Now referring to FIG. 1 there is shown the entire system of a sensor-Net system in accordance with the first preferred embodiment of the present invention. The sensor-Net system is made up of a management server 4 equipped with a middleware for controlling the sensor nodes and managing the association of nodes, plural gateway nodes 1, plural router nodes 2, and plural sensor nodes. The management server 4, the router node 2, and sensor node 3 are connected by wireless communication, establishing a personal area network (PAN). The gateway node 1 and the management server 4 may be connected by an Ethernet or a USB (universal serial bus).

Figure 2:
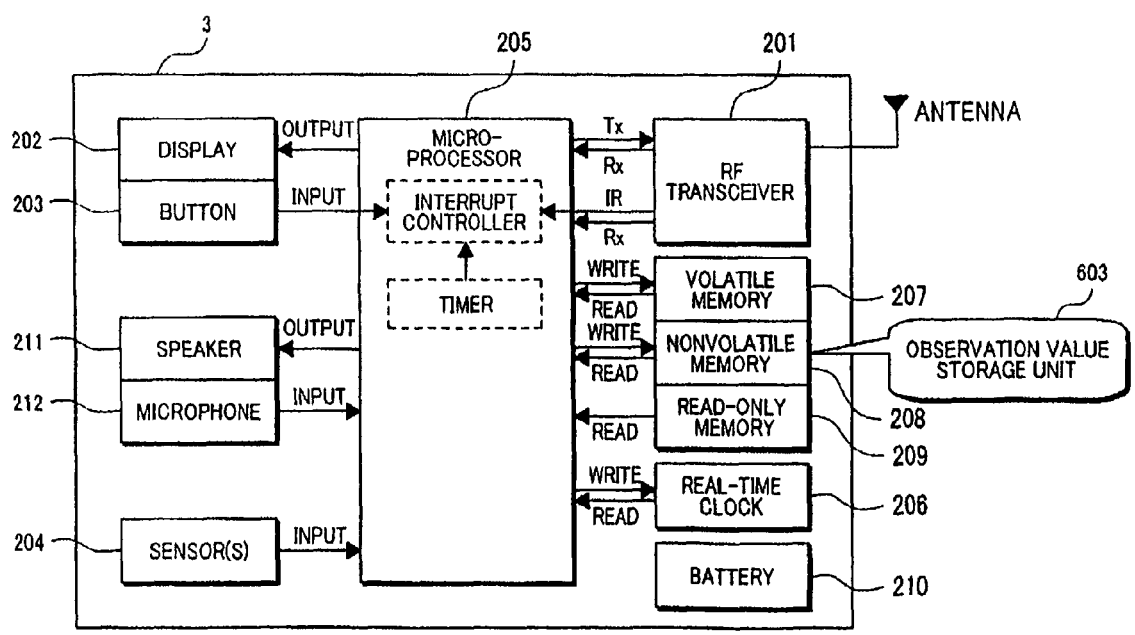
FIG. 2 shows a schematic block diagram illustrating the hardware arrangement in the sensor node in accordance with the first preferred embodiment of the present invention.

Now referring to FIG. 2, there is shown a schematic diagram illustrating an exemplary hardware configuration in the sensor node 3 used in the sensor-Net system shown in FIG. 1.

The sensor node 3 includes an RF transceiver 201 for wireless transmission and reception, a display 202, a button 203, a sensor(s) 204, a microprocessor 205 which is the processing unit, a real-time clock 206 which maintains the absolute time, a volatile memory 207, nonvolatile memory 208, and read-only memory 209 which serve as the storage unit, and a battery 210 for supplying power to the components of the node.

The sensor node 3 may be one of either two states for a given period of time, namely sleep mode in which all hardware is powered off except for the real-time clock 206, and an operation mode in which all circuits are powered on. When in the operation state the sensor node 3 senses using a variety of sensors 204. The sensed information is put into packets by the microprocessor 205 along with the time information of the real-time clock 206, is sent via a wireless means to the gateway node and to the router node from the RF transceiver 201 as well as is stored in the nonvolatile memory 208.

The button 203 is an input device for accepting the operation by the user. With a specific sequence of button a specific operation of the sensor node 3 may be invoked or the operation parameter may be set.

The display 202 is an output device for displaying information to the user. For example, if the sensor node 3 is placed indoor or outdoor for use as environment measurement, the latest measurement value measured by the sensor(s) 204 may be displayed thereon. To save power, it is preferable that the display normally is turned off but indicates the latest measurement value only when a specific combination of button is pressed. If the sensor node 3 is a name plate type, or watch type portable sensor node, it usually displays time but when it receives a text message from the management server 4 it may display the message or when it receives a voice message it may display the information of reception. The node may display a hierarchy menu in association with the button sequence by the user. By pressing button in accordance with the menu, the application user or system manager may set the operation parameters of the sensor node, or confirm the error information when the communication is failed.

Now referring to FIG. 3 there is shown an exemplary hardware arrangement of the router node 2 in the sensor-Net system shown in FIG. 1. The router node includes an RF transceiver 301 for the wireless transmission and reception, a display 302, a button 303, a sensor(s) 304, a microprocessor 305, a real time clock 306 which maintains the absolute time, a volatile memory 307, a nonvolatile memory 308, and a read only memory 309.

The router node uses the time configuration managing table 311 stored in the volatile memory 307 to manage the path to the sibling sensor nodes. The command distributed by the wireless communication from the gateway node to the sensor nodes is received by the RF transceiver 301, and routes the command to the sensor nodes present in the table time configuration managing table 311. Also it receives the sensing information transmitted by the wireless communication from a sensor node to transmit thus received sensing information to the gateway node by the wireless communication.

The router RT1 is required to always wait for the data from the sensor node or the gateway node, but does not know when the data is sent, so that it operates by the external power instead of a battery unlike the sensor node. The power supplied through the power line is rectified by a power supply circuit 310 to provide to the components.

Since the router node 2 does not need to be worried about the consumption power, the microprocessor 305 of the router node 2 is not required to be put into the sleep mode, unlike the sensor node 3. The interrupt controller and timer, which are not shown in the figure, thereby have the function used in the limit of generic data transmission and reception algorithm.

Now referring to FIG. 4 there is shown an exemplary hardware arrangement of the gateway node 1 used in the sensor-Net system shown in FIG. 1.

The gateway node has the similar components to the router node 2 except for having a LAN interface (LAN I/F) 412 for communicating with the middleware server 4 through an IP network, the detailed description thereof will be omitted. In the figure the reference numbers 401 to 410 correspond to the reference numbers 301 to 310 in FIG. 3. In the volatile memory 407 there is stored a binding table 411 as will be described later.

Figure 5:
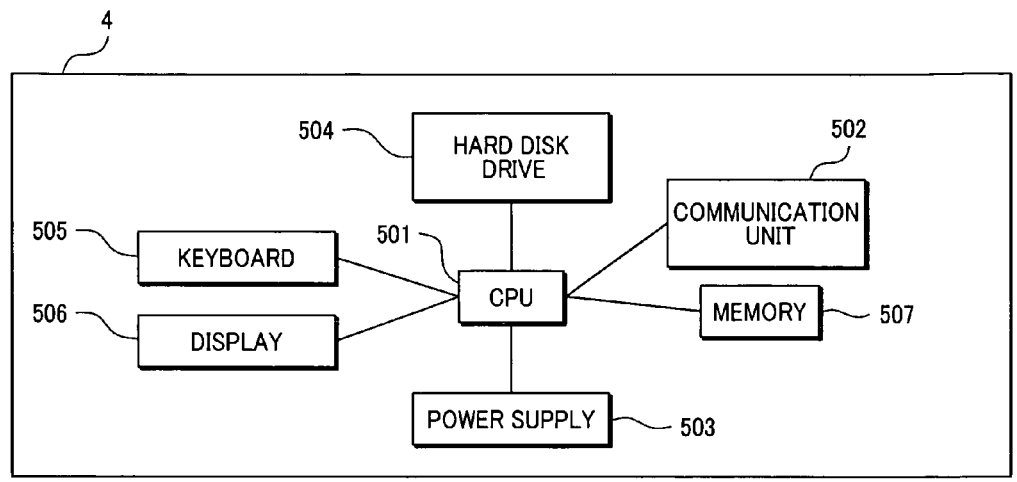
FIG. 5 shows a schematic block diagram illustrating the hardware arrangement of a management server in accordance with the first preferred embodiment of the present invention.

Now referring to FIG. 5 there is shown a schematic block diagram illustrating an exemplary hardware arrangement of the sensor-Net system management server 4 shown in FIG. 1.

The sensor-Net management server 4 includes a processor (CPU) 501, a communication unit 502, a power supply 503, a hard disk drive 504, a keyboard 505 which is an input device for a user to input a command, a display 506, and a memory 507.

The sensor-Net management server 4 receives through the communication unit 502 the data collected by the gateway node 1 from the sensor node 1 through the router node 2, and transmits the commands to the gateway node 1. The CPU 501 reads such programs as middleware stored in the memory 507, processes, by the instruction of the program, such data as the observation values obtained through the communication unit 502, stores the data to the hard disk drive 504, or displays the data onto the display 506. A more specific example of processing and display executed by the management server 4 will be described in greater details later. The CPU 501 interprets the user command input from the keyboard 505 to transfer through the communication unit 502 to the gateway node 1.

Figure 6:
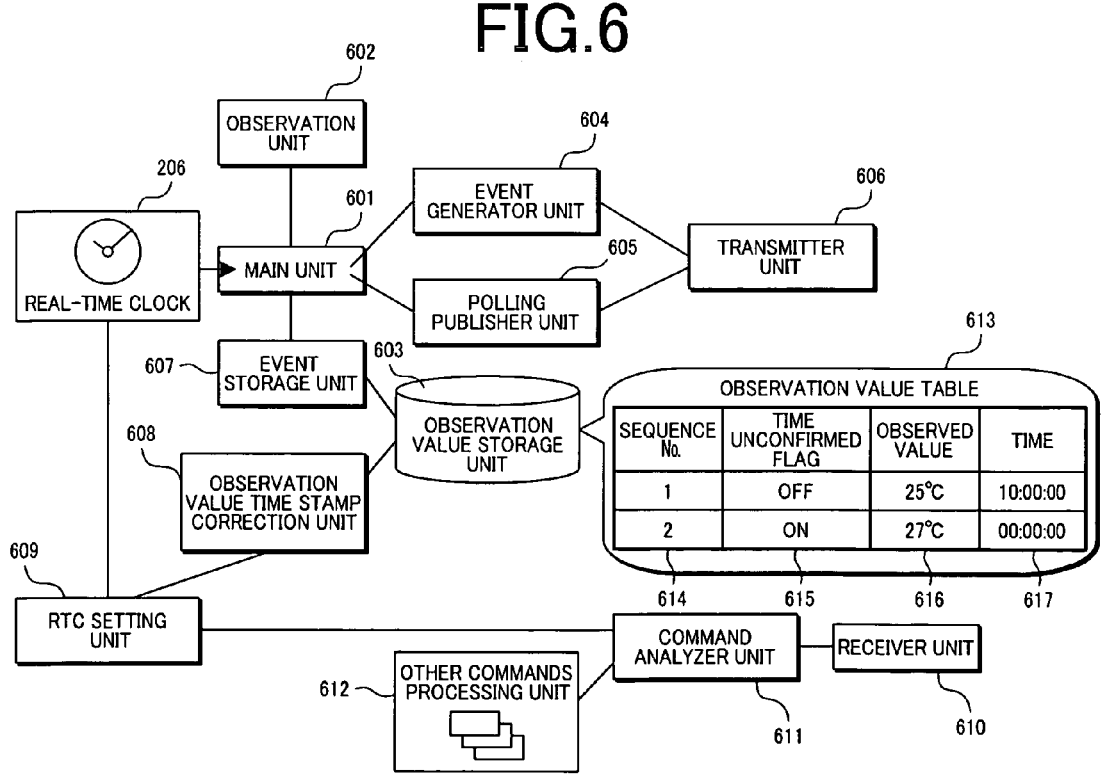
FIG. 6 shows a functional block diagram illustrating the functional arrangement of the sensor node in accordance with the first preferred embodiment of the present invention.

Now referring to FIG. 6 there is shown a schematic block diagram illustrating the functionality of the sensor node 3 in the preferred embodiment.

The function of the sensor node 3 includes, the real-time clock 206 for managing the time, a main unit 601 for storing the observation value and for managing the event publishing and polling publishing, an observation unit 602 for using the sensor(s) for the observation, an event publisher unit 604 for publishing an event such as the observation value, a polling publisher unit 605 for publishing to the router node 2 or to the gateway node 1 the polling to confirm whether a command is present or not, a transmitter unit 606 for transmitting an event or a polling, an observation value storage management unit (event storage unit) 607 for managing the storage of observation values, an observation value storage unit 603 for storing the observation values and managing by the observation value table 613, an observation value time stamp correction unit 608 for correcting the time stamp of the observation values which has the time unconfirmed flag set to ON (a flag which means the observation time is unconfirmed) in the observation value table 613, an RTC setting unit 609 for setting and correcting the real time clock, a receiver unit 610 for receiving commands from the parent router node or the parent gateway node, a command analyzer unit 611 for analyzing received commands, and an other commands processing unit 612 for processing any other commands than the time setting.

The observation value table 613 stored in the observation value storage unit 603 stores the sequence number 614 which is the serial number of the observation values, a time unconfirmed flag 615 which stores whether the time is confirmed or unconfirmed in an observation value, an observation value 616, and the time of the observation value 617. In the hardware configuration of the sensor node 3 as shown in FIG. 2, the observation value storage unit 603 is formed on the nonvolatile memory 203.

The transmitter unit 606 and the receiver unit 610 shown in FIG. 6 correspond to the RF transceiver 201 shown in FIG. 2. Other components including the main unit 601, the observation unit 602, the event publisher unit 604 to the RTC setting unit 609, the command analyzer unit 611, the other commands processing unit 612 are program functions executed by the microprocessor 205 of FIG. 2, these programs are stored in general on the storage unit such as the read-only memory 209.

Figure 7:
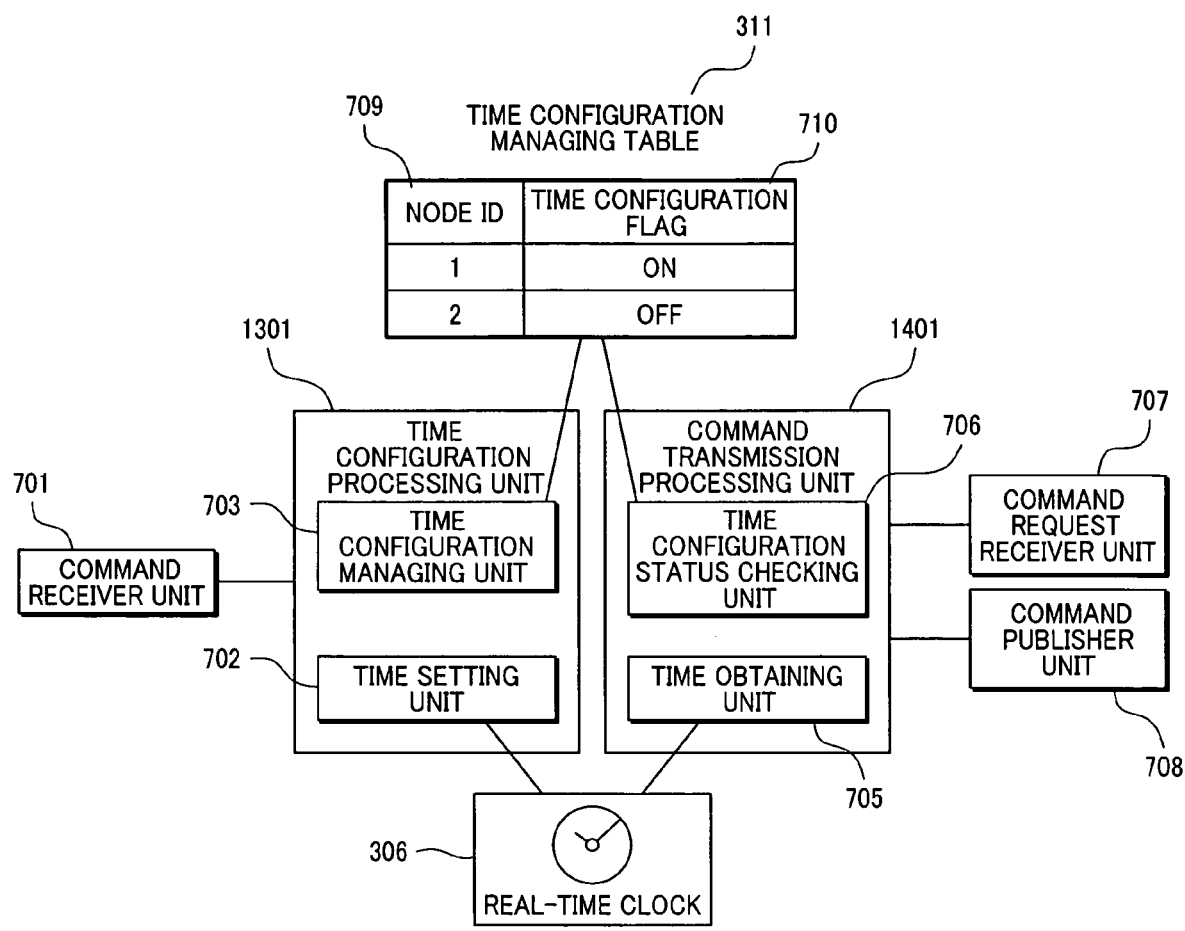
FIG. 7 shows a functional block diagram illustrating the functional arrangement of the router node in accordance with the first preferred embodiment of the present invention.

Now referring to FIG. 7 there is shown a schematic block diagram illustrating the function of the router node 2 in accordance with the preferred embodiment of the present invention.

The router node 2 includes a command receiver unit 701, a time configuration processing unit 1301, and a command transmission processing unit 1401, a command request receiver unit 707, a command publisher unit 708, and a real-time clock 306. The time configuration processing unit 1301 includes a time configuration manager unit 703 and a time configuration manager unit 702. In the command transmission processing unit 1401 there are a time configuration status checking unit 706 and a time obtaining unit 705. The volatile memory 307 shown in FIG. 3 has a time configuration managing table 311. In the time configuration managing table 311 the sensor node ID 709 each allocated for each sensor node, and a time configuration flag 710 for determining whether or not the sensor node in the node ID 709 has the time configured.

The router node 2 receives the command transmitted from the management server 4 at the command receiver unit 701. When the received command is setTime command, the time setting unit 702 for setting or correcting the time of the real time clock 306 and the time configuration manager unit 703 for setting On the time configuration flag of the sensor node registered in the time configuration managing table 311 will work.

The polling command from the sensor node 3 is received by the command request receiver unit 707. The time configuration status checking unit 706 will check to see the time configuration flag 710 of the sensor node when receiving the polling from the sensor node in the time configuration managing table 311. The time obtaining unit 705 obtains the time from the real time clock 306. The command publisher unit 708 publishes a command to the sensor node 3. These functions are, needless to say, of the program sequentially executed in the microprocessor 305 shown in FIG. 3, and this applies to the following description as well.

Figure 8:
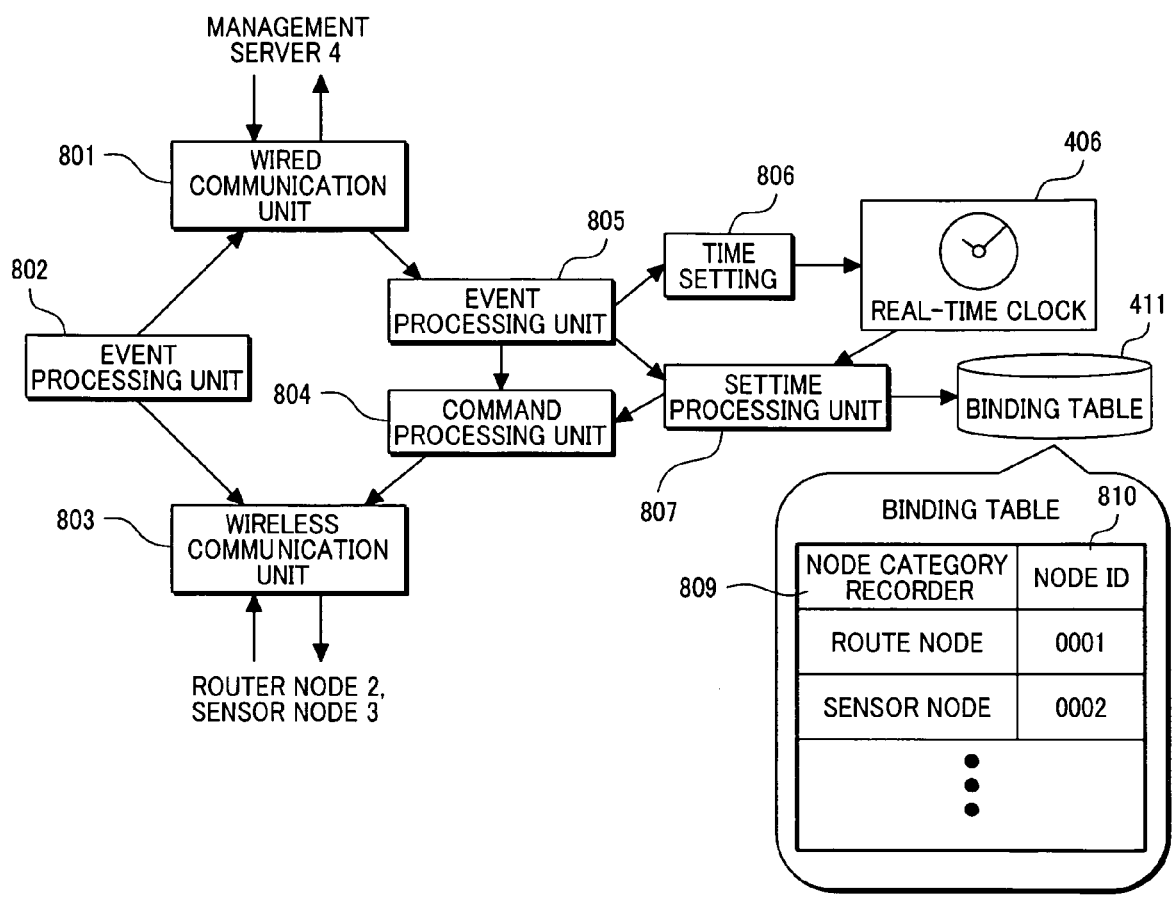
FIG. 8 shows a functional block diagram illustrating the functional arrangement of the gateway node in accordance with the first preferred embodiment of the present invention.

Now referring to FIG. 8 there is a schematic block diagram illustrating the function of the gateway node 1 in accordance with the preferred embodiment of the present invention.

The function of the gateway node 1 includes a wired communication unit 801 for communicating with the management server 4, a command processing unit 805 for processing commands from the management server 4, a time configuration unit 806 for setting the real time clock 806 in the gateway node 1, a setTime processing unit 807 for referring the binding table 411 to process the setTime command when receiving the setTime command, a command publisher 804 for publishing the command to the sibling router node 2 or to the sibling sensor node 3 present in the binding table 411, a wireless communication unit 803 for wireless communication with the router node 2 and the sensor node 3, and an event processing unit 802 for processing events received from the router node 2 or the sensor node 3. In the binding table 808 a node category recorder 809 for storing the category by determining whether the recorded node is a router or a sensor node, and a node ID 810 each provided for each node are stored.

Figure 9:
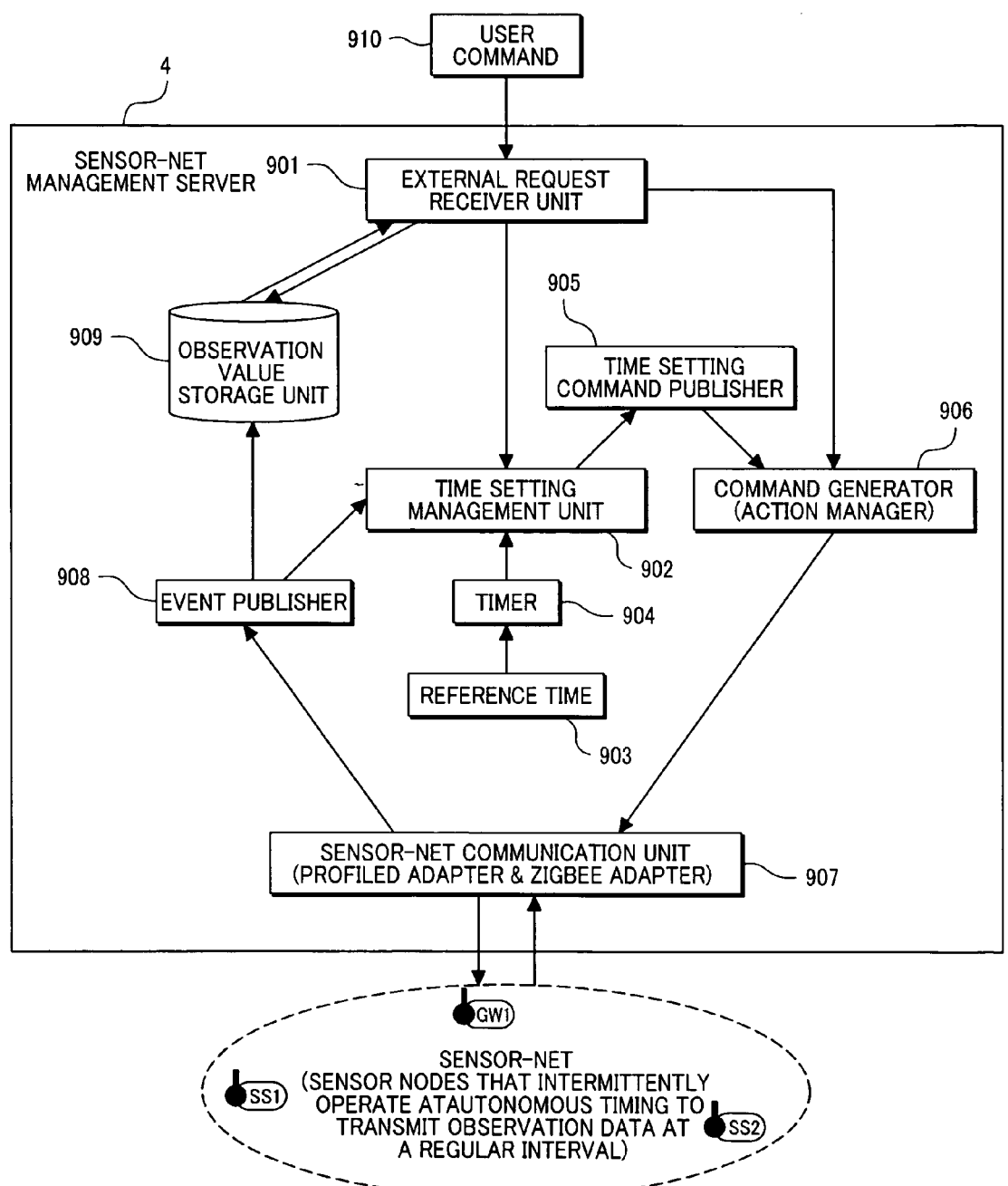
FIG. 9 shows a functional block diagram illustrating the functional arrangement of the sensor-Net management server in accordance with the first preferred embodiment of the present invention.

Now referring to FIG. 9, there is shown a schematic block diagram illustrating the network management function of the sensor-Net management server 4 in accordance with the preferred embodiment of the present invention.

The network management function of the management server 4 includes a time configuration management unit 902, an external request receiver unit 901 for receiving a user command 910 and for transferring to the time configuration management unit 902 or to the action manager 906 and transmitting the response to the external entity, a timer 904 for synchronizing with a reference time 903 such as NTP (network time protocol) to issue a setTime command at a given time, a setTime command publisher 905 for issuing the setTime command, a sensor-Net communication unit 907 (Profiled adapter & ZigBee adapter) which corresponds to the communication unit 502 for communicating with the gateway node 1, an event publisher 908 for transferring the event from the gateway node 1, or the router node 2, or the sensor node 3, and an observation value storage unit 909 for storing the observation value of the sensor node 3. The observation value storage unit 909 is formed on the storage unit such as the hard disk drive 504 or the memory 507 in FIG. 5, and the function units except for the observation value storage unit 909 and the sensor-Net communication unit 907 are configured as the processing function of the CPU 501 shown in FIG. 5.

Now the time synchronization of the entire system by using the configuration and function of these devices in the sensor-Net system in accordance with the preferred embodiment of the present invention will be described in greater details below.

Figure 10:
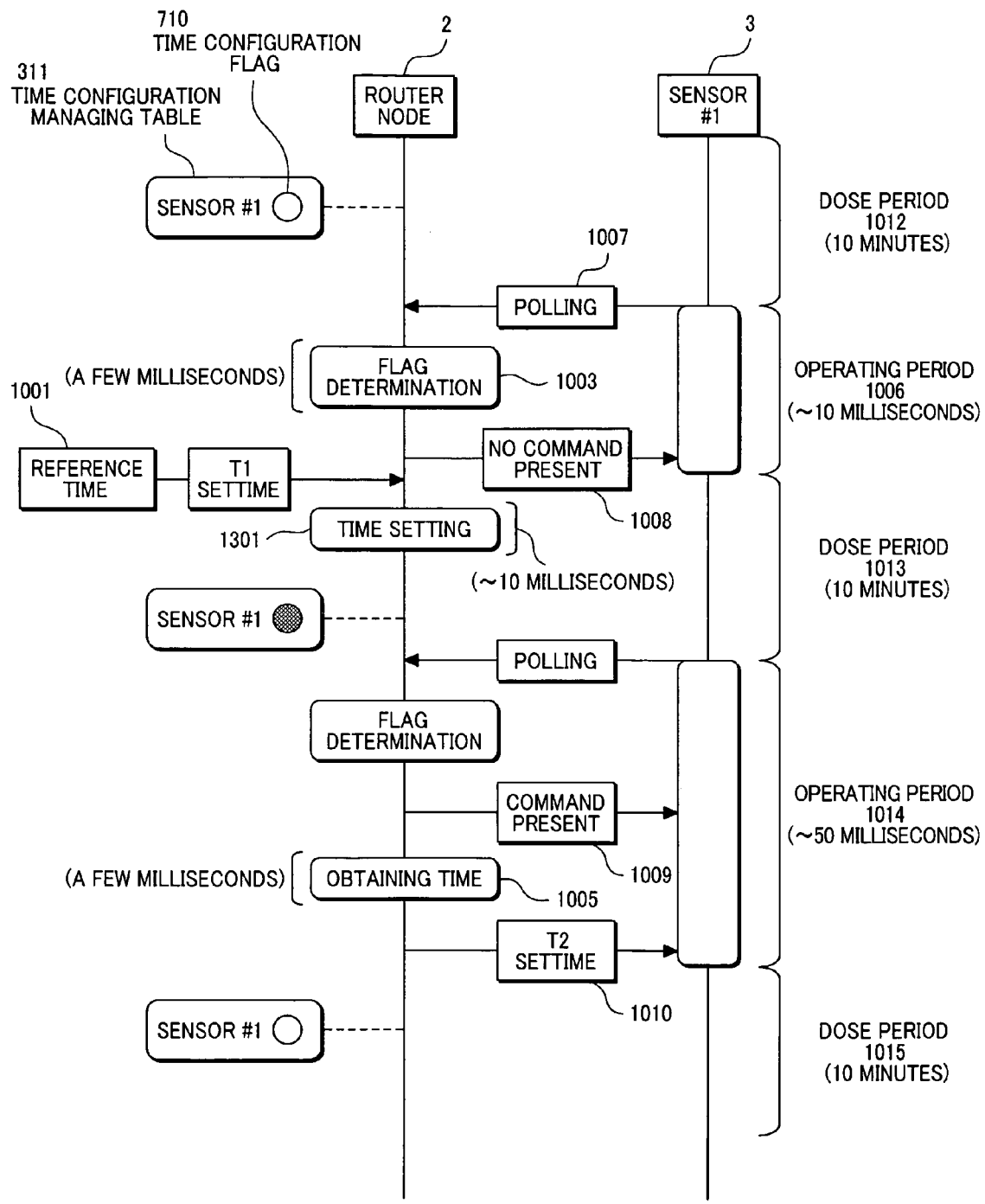
FIG. 10 shows a sequential diagram for setting time between the router node and a node in accordance with the first preferred embodiment of the present invention.

Now referring to FIG. 10, there is shown a time configuration sequence diagram between the router node 2 and the sensor node 3 (sensor #1) when the sensor node 3 (sensor #1) is intermittently operating at the interval of 10 minutes. Any other operations except for the time configuration such as observation are omitted in this figure because FIG. 10 only illustrates the time configuration sequence.

When the sensor #1 returns from the sleep mode 1012 and enters into the active mode 1006, the sensor #1 will poll 1007 the parent router node 2. At this time the router node 2 has not received yet any setTime, and the time configuration flag 710 in the time configuration managing table 311 is OFF (displayed as white in the figure). The router node transmits a no command present 1008 as the response to the polling 1007. The sensor #1 upon reception of the response immediately moves to the sleep mode 1013. The duration of the active period 1006 may be in the range from a few milliseconds to tens milliseconds, including the polling and the reception of the response.

Thereafter, the router node 2, which receives the reference time 1001 issued by the management server 4, will set or correct the real time clock 306 of the router itself, then set to ON the time configuration flag 710 of the sibling sensor nodes 3 registered in the time configuration managing table 311 (displayed as gray in the figure). The router node 2, when receiving a command request as polling 1007 from the sibling sensor node (sensor #1) which is registered in the time configuration managing table 311, confirms the time configuration flag 710, and if the flag is ON, then it will respond with a command present 1009, obtains the time from the real time clock 306 of the router itself (step S1006), transfers the time (t2) to the sensor #1 as the setTime command 1010. Thereafter the sensor node 3 turns OFF the time configuration flag 710 of the sensor node. The sensor #1, upon reception of the response to the command present 1009, will wait for a while in a stand-by state, then will correct, based on the received time (t2), the time of the real-time clock 206 of the sensor node itself. The active period 1014 of the sensor #1 at this time may be longer than the active period 1006 because the sensor node receives the setTime command to reconfigure the time, however the period may be in the range from 10 milliseconds to 50 milliseconds on total, which is an instant when compared with the duration of sleep period which is 10 minutes.

Figure 11:
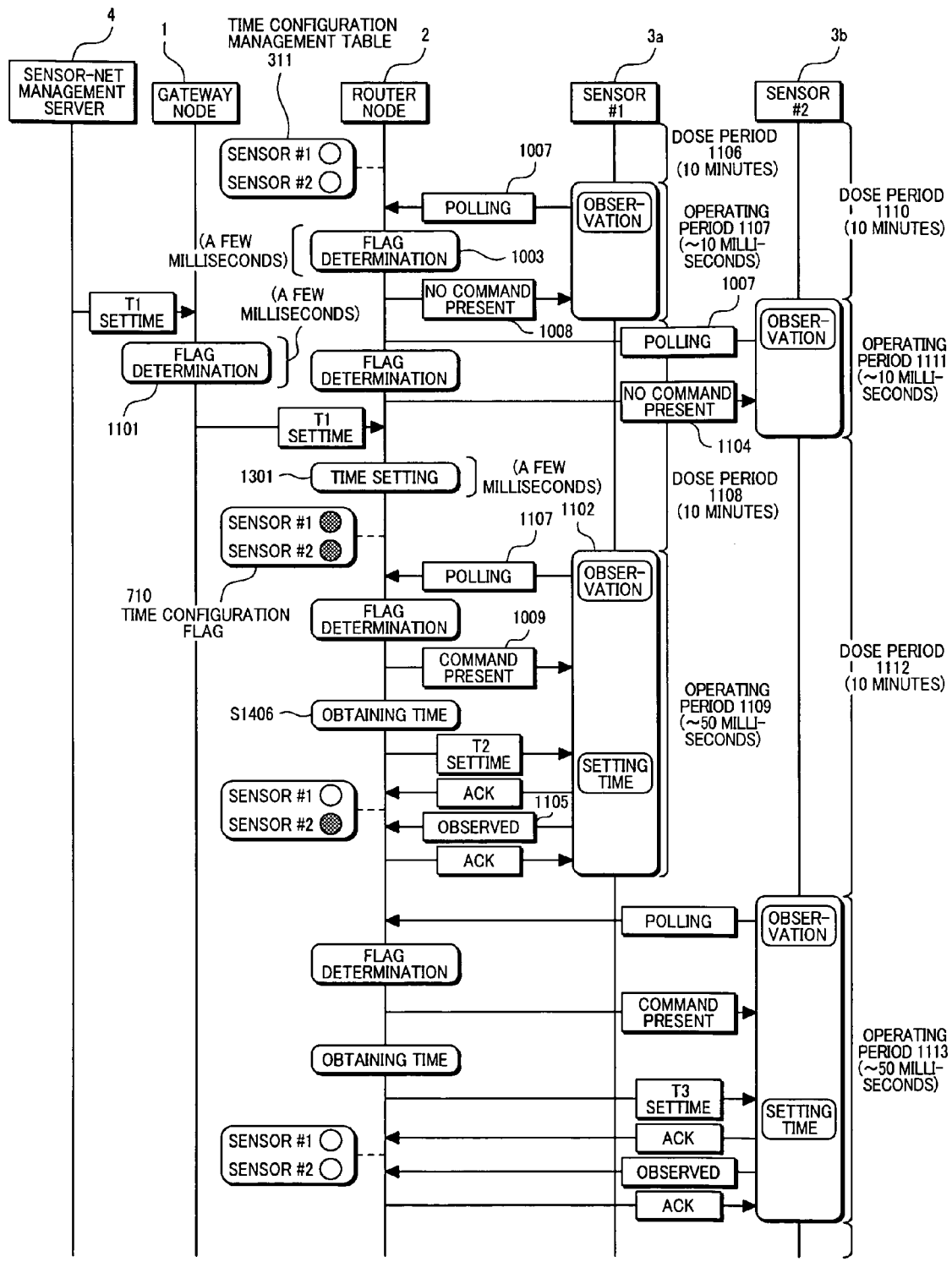
FIG. 11 shows a sequential diagram for setting time between the router node and plural sensor nodes in accordance with the first preferred embodiment of the present invention.

Now referring to FIG. 11, there is shown a time configuration sequence diagram between the management server 4 and the gateway node 1 and the router node 2 and two sensor nodes 3. The time configuration sequence will be similar even if there are more than three sensor nodes 3.

The sensor #1, which returns from the sleep period 1106 and enters into the active period 1107, will poll 1007 to the parent router node 2. At this time the router node 2 has not received yet any setTime command, and because the time configuration flags 710 in the time configuration management table 1111 are all OFF, the router node 2 will transmit a no command present 1008 as the response to the polling 1007 to the sensor #1. The sensor #1, which has received the response thereto, will immediately enter into the sleep mode 1108. The duration of the active period 1107 may be in the range from a few milliseconds to tens milliseconds, including the polling and the reception of the response thereto. A sensor #2, in a similar manner, which returns from the sleep mode and enters into the active period 1111, will send a polling 1103 to the parent router node 2. The router node will respond the no command present 1104 to the sensor as was done in case of the sensor #1, and the sensor #2, upon reception of the response thereto, will immediately enter into the sleep mode 1112.

The management server 4, as have been described above, is synchronized with a reference time by NTP. The management server 4 sends a time (t1) as the setTime command to the gateway node 1 at a regular basis, or at the time specified by the user. The gateway node 1 uses thus received time (t1) to set or correct the real time clock 406 of the station itself (1101). The gateway node 1 will confirm the binding table 808, which is a management table of the nodes reachable from the gateway node, at the same time as the real time clock configuration 1101, and transmits the time (t1) obtained from the management server 4 as the setTime command to the sibling routers registered in the table. Although there is shown only one router node 2 in FIG. 11, the time is synchronized by transmitting the time (t1) to all routers in a similar manner if there are plural routers registered in the table.

The router node 2 will set or correct the real time clock 306 in the router itself based on the time (t1) received from the gateway node (1301), then set to ON the time configuration flag 710 to all sibling sensor nodes registered in the time configuration managing table 311. The sensor node 3a (sensor #1), immediately after returned from sleep period 1108, will perform the observation (1102), then send a polling 1107 as the command request to the router node 2. The parent router node 2 of the sensor #1, upon reception of the polling 1107 as the command request from any one of the sibling sensor nodes registered in the time configuration managing table 311, will confirm the time configuration flag 710 of the sensor node, and respond with a command present 1009 if the flag is ON, and obtains (S1406) the time from the real time clock 306 of the router node 2 itself to send the time (t2) as the setTime command. Thereafter, when it receives an Ack which is the response to the setTime command from the sensor #1, the router turns OFF the time configuration flag 710 of the sensor node. At this time the active period 1109 of the sensor #1 will be longer than the active period 1107, because the sensor #1 receives the setTime command and set the time, however the period may be in the range from 10 milliseconds to 50 milliseconds, including the processing time of polling, time configuration reception, sending an observed event (1105), and receiving a reply (Ack), so the active period may be an instant when compared with 10 minutes of the duration of the sleep period.

The sensor node 3b (sensor #1) upon reception of the reply to the command present 1009, will wait for a while in a stand-by state, then correct the time in the real-time clock 206 of the sensor node itself based on the received time (t2). The sensor #1 obtains the time from its real time clock 206 and attaches it to the observation value for sending to the router node 2 as an observed event (1105). The sensor node 3b (sensor #2) will perform a similar sequence as the time configuration sequence of the sensor #1.

Although not shown in FIG. 11, there may be cases in which plural sensor nodes 3 are directly connected to the gateway node 1. In such a case the sequence between the gateway node 1 and a sensor node 3 is just identical, with the router node 2 being replaced with the gateway node 1 in the sequence between the router node 2 and the sensor node 3, in which the gateway node 1 and the sensor node 3 will behave in a similar manner.

Figure 12:
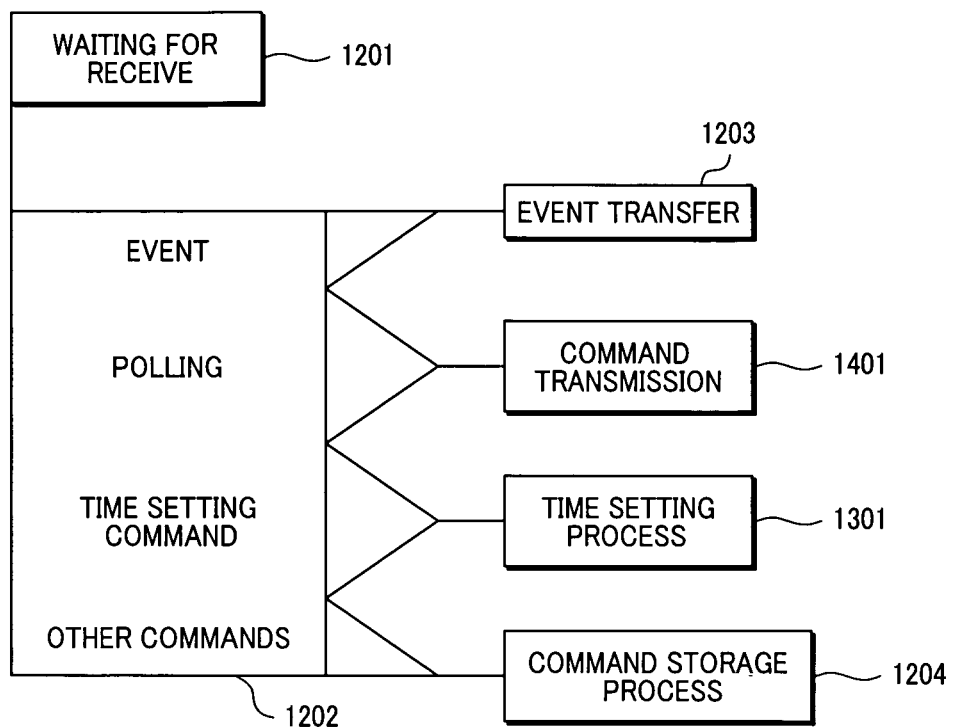
FIG. 12 shows a PAD diagram illustrating the operational sequence of the router node in accordance with the first preferred embodiment of the present invention.

Next, referring to FIG. 12 there is shown a PAD diagram of the operation of the router node 2 in accordance with the preferred embodiment of the present invention.

The router node 2 will perform an event transfer 1203 for transferring to the gateway node 1 if the received data is an event such as the observation value from the sensor node 3, a command transmission 1401 in case of polling from the sensor node 3, a time configuration processing 1301 when having received a setTime command from the gateway node 1, and a command storage 1204 when receiving any command other than the time configuration.

Figure 13:
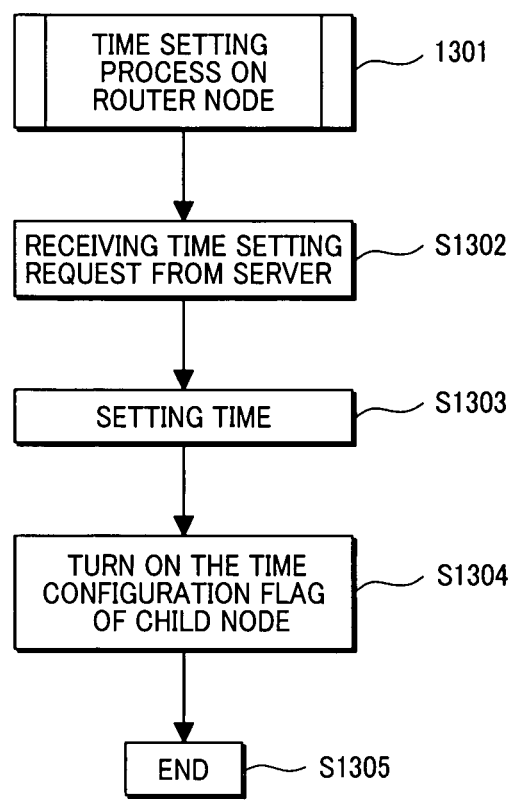
FIG. 13 shows a flow chart for setting the real time clock in the router node in accordance with the first preferred embodiment of the present invention.

Now referring to FIG. 13 there is shown a time configuration sequence diagram in the time configuration processing unit 1301. The router node 2 receives in the command receiver unit 701 a setTime command through the gateway node 1 from the management server 4 (step S1302). Then the time configuration unit 702 will set the real time clock 306 of the router itself to the time described in the setTime command (step S1303). Then the time configuration manager unit 703 turns ON all time configuration flags 710 of the sibling nodes which are managed in the time configuration managing table 311 (step S1304), and the process terminates (step S1305).

Figure 14:
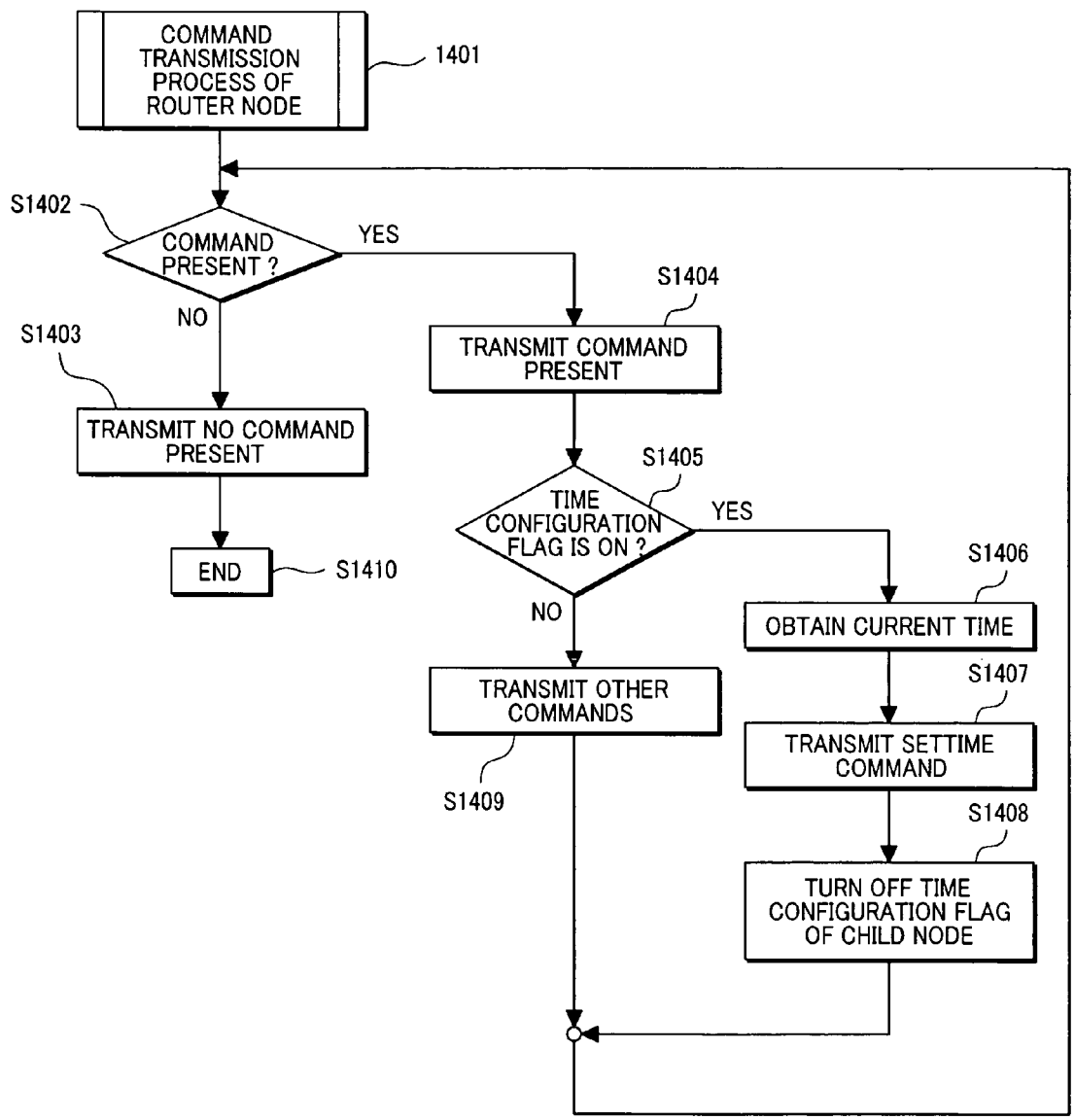
FIG. 14 shows a flow chart at the time of command transmission of the router node in accordance with the first preferred embodiment of the present invention.

Now referring to FIG. 14 there is shown a command transmission sequence of the router node 2. The router node 2, upon reception of a polling, the command request from the sensor node 3, at the command request receiver unit 707, will determine whether there is a stored command (step S1402), and if there is a command then it will send a command present to the sensor node (step S1404). Thereafter, the time configuration status checking unit 706 will determine the time configuration flag 710 of the sensor node in the time configuration managing table 311 (step S1405), and if the flag is ON then the time obtaining unit 705 will obtain the current time from the real time clock 306 of the router node 2 (step S1406), will send a setTime command from the command publisher unit 708 (step S1407), then will turn off the time configuration flag of the sensor node (step S1408), and will check to see if there is still another command stored therein (step S1402). If the time configuration flag 710 is OFF, then it will send another stored command (S1409), and will check to see if there is still another command stored therein (S1402). If there is no more command stored for the sensor node, it will send no command present to the sensor node (step S1403), and the process terminates (S1410).

Figure 15:
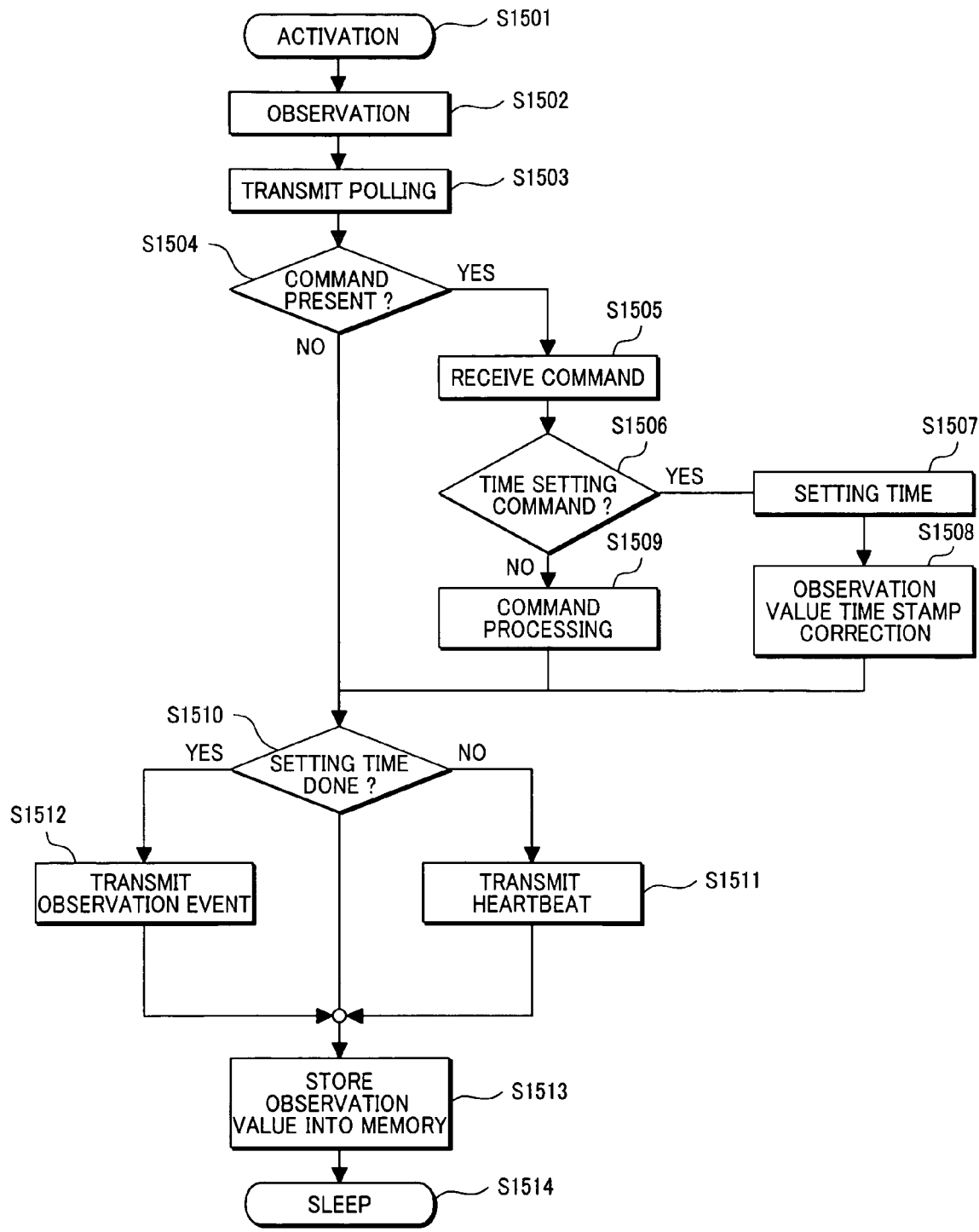
FIG. 15 shows a flow chart at the time of activation of the sensor node in accordance with the first preferred embodiment of the present invention.

Now referring to FIG. 15 there is shown a flow chart of the operation of the sensor node 3 in accordance with the preferred embodiment of the present invention.

The sensor node 3 intermittently operates, in which it repeats the activation to enter into the active state (S1501) and the deactivation to enter into the sleep state (S1514) at a regular interval. For the activation interval, an independent period may be set for any sensors if a sensor node is equipped with plural sensors 204. When the sensor node 3 is activated, it will observe (S1502) in the observation unit 602 as shown in FIG. 6, issue a polling from the polling publisher unit 605, then send the polling from the transmitter unit 606 to the parent router node 2 (S1503). It will receive the reply from the router node 2 by the receiver unit 610, will determine whether there is either a command present or a no command present (S1504), and will receive the command if there is a command present (S1505). The command analyzer unit 611 will determine whether the command received is a setTime command or not (S1506), if it is a setTime command then the RTC setting unit 609 will set or correct its real-time clock 206 (S1507), then the observation value time stamp correction unit 608 will correct the time stamp of any observation values with the time unconfigured flag being ON, from within any previous observation values in the observation value table 613 (step S1508). If the received command is not a setTime command then the other commands processing unit 612 will process the command (S1509).

After finishing the processing of the command, the sensor node 3 will determine whether it has already time configured (S1510), if the time is configured then the event publisher unit 604 will issue an event with the current time appended as time stamp to the observation value, then the observation event will be sent to the parent router node 2 or to the parent gateway node 1 from the transmitter unit 606 (step S1512). If the sensor node 3 is not yet time configured then the observation value will not be sent, however a HeartBeat event will be sent to the parent router node 2 or to the parent gateway node 1 in order to notify of the alive sensor node 3 (S1511).

After the transmission of the event, the sensor node 3 stores the observation value into the memory along with the sequence number, time unconfigured flag, and the time of real time clock (S1513), and will enter into the sleep mode (step S1514).

Now referring to FIGS. 16A and 16B, there are shown schematic diagrams illustrating the time stamp correction (S1508) of the observation value table 613 in the sensor node 3 shown in FIG. 15. FIGS. 16A and 16B illustrate examples of data in the observation value table 613 in the sensor node 3 before and after correction of the time stamp, respectively.

The sensor node 3 calculates the difference between the time stamp of the latest observation value and the time in the setTime command, at the time when it receives the setTime command from its parent router node 2 or the parent gateway node 1 and configures the time. Then by referring to the observation value table 613 of the sensor node, it will correct the time by adding the difference to the time stamp of the observation value with the time unconfigured flag being ON, then will turn OFF the time unconfigured flag to correct the time stamp of the observation value.

The difference as have been described above may also be the difference between the time in the setTime command and the time before correcting the real-time clock 206 at the time of reception of the setTime command. the correction timing of the time stamp may be at any given time after the calculation of the difference.

The observation event including the observation value data, sent from the transmitter unit 606 of the sensor node 3 to the parent router node 2 or to the parent gateway node 1, will be all transferred to the management server 4, stored in the observation value storage unit 909 in the storage unit of FIG. 5 or FIG. 9, then will be processed appropriately as an example will be described later.

Embodiment 2

Figure 17:
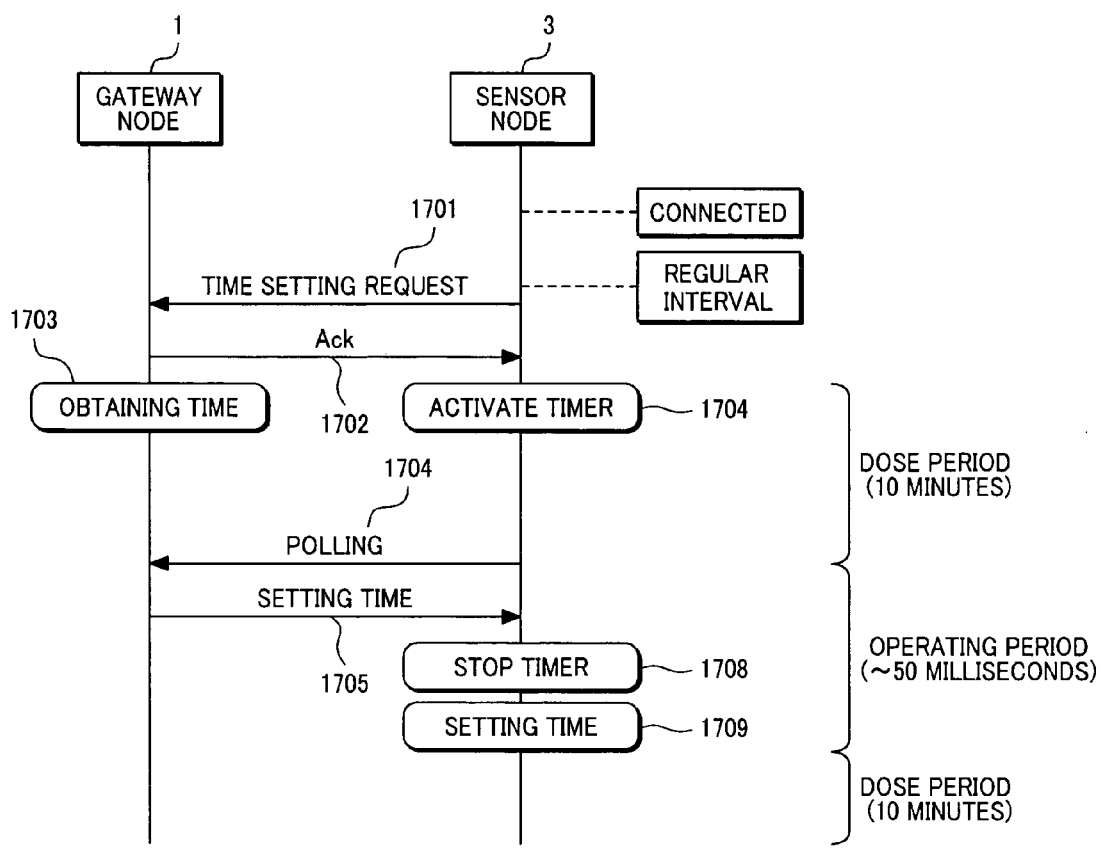
FIG. 17 shows a time setting sequence diagram in a sensor-Net system in accordance with the second preferred embodiment of the present invention.

A sensor-Net system which adopts another time synchronization method as shown in FIG. 17 will be described in greater details herein below as second preferred embodiment of the present invention.

Now referring to FIG. 17 there is shown a schematic diagram illustrating a sensor node initiative time configuration sequence which implements the time synchronization at the timing requested by a sensor node 3, when the sensor node 3 (sensor) is connected directly to the gateway node 1. The sensor node 3 sends a time configuration request (1701) to the gateway node 1 when connected to the gateway node 1 or at a regular basis. The gateway node 1 will send an Ack 1702 to the time configuration request while obtaining the reference time information (1703). The time required for the gateway node to obtain the time information after having received the time configuration request may be approximately one millisecond.

The sensor node 3 invokes its internal timer at the time when it receives the Ack to the time configuration request (1704). Since the processing time required for the sensor node 3 to receive the acknowledgement after the gateway node 1 sends the acknowledgement is approximately one millisecond, this time may be considered to be approximately the same duration as the time required for the gateway node 1 to receive the time configuration request and to set the time.

The time as have been described above is the timer built-in to the microprocessor within the sensor node 3. For example in case of H8S/2215 of Renesas Technology Corp., the time accuracy is 1 ppm, so the error for setting time may be neglected. However some processing than the time configuration by interrupt are needed, so that the time accuracy is 10 milliseconds. In the sleep period the microprocessor is sleeping in the low power mode while the timer operation continues to be executed.

When the sensor node 3 transmits a polling command, the command request, at the time when it is reactivated for the next time (1704), the gateway node 1 in turn transmits to the sensor node 3 the time obtained as second setTime command for the reply thereto (1705). The sensor node 3 stops the timer at the time when it receives the second setTime command from the gateway node 1 (1708), it sets its own real-time clock 206 as current time by the time adding the time received concurrently with the second setTime command with the time measured by the timer (1709).

By setting the time as have been described above, the sensor nodes 3 with the time synchronized with the gateway node 1, in a similar manner to FIG. 11 in the first preferred embodiment, will send the stored observation values to the gateway node 1 directly. The detailed description will be omitted however to avoid the repetition.

Figure 18A:
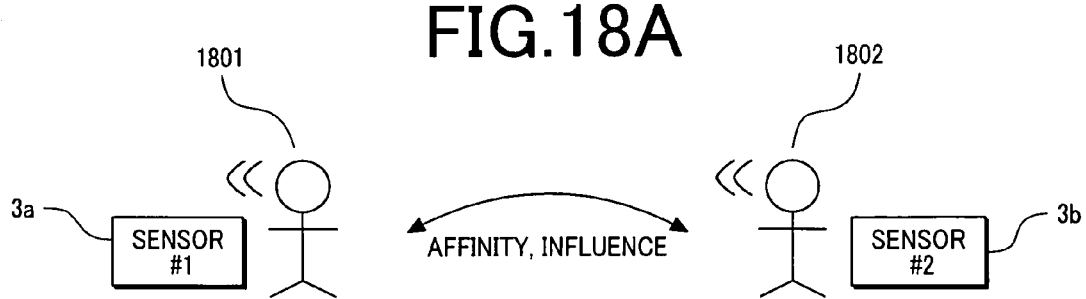
FIGS. 18A to 18C show schematic diagrams illustrating the time synchronization function between the sensor nodes in accordance with the second preferred embodiment of the present invention.
Figure 18B:
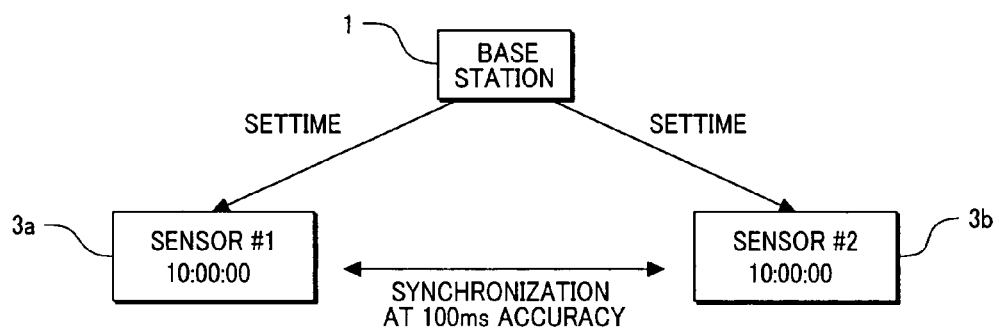
Figure 18C:
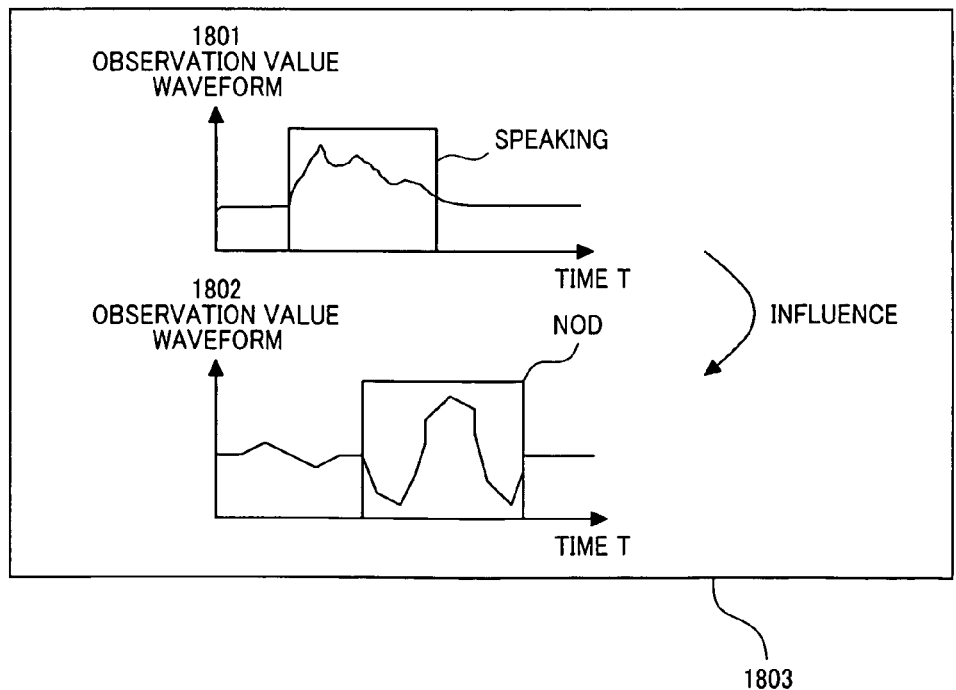

Now referring to FIGS. 18A to 18C, there are shown an applied system function for determining the influence between plural persons each wearing a sensor node by using the sensor-Net system based on the time synchronization scheme as described above and by using the observation value data stored in the observation value storage unit 909 of the management server 4. As shown in FIG. 18A assuming that more than two persons 1801 and 1802 have or wear the sensor nodes 3a and 3b. For example, a person 1802 is considered to be affected by another person 1801 if during a conversation between the person 1801 and the person 1802, the person acts a gesture such as the person nods for expressing the accordance with an important speech of the observation value waveform 1801, or the person 1802 gives a grunt or writes down the phrase in accordance with the speech of the person 1801. In addition, there may be a negative influence if one goes away from the other. Such action or speech may not be randomly present, rather as shown in block 1803 of FIG. 18C, it appears on the observation value waveform of the acceleration or voice of the person 1802 after a delay less than a second from the observation of the speech or action by the observation value waveform of the acceleration or voice of the person 1801.

From the above fact, between sensor nodes 3 of FIG. 18B, by determining the correlation of the action in the time axis between the dialogists from the sensor signals from the sensor nodes 3a and 3b, which are synchronized for example at the precision of 100 milliseconds, the communication between the dialogists may be given. The observation values synchronized between the sensor nodes 3 will be therefore important, and as the synchronization scheme used for the context the time synchronization scheme is to be adopted as have been described above. In the following applied system description, it is assumed that, under the time synchronization scheme adopted as have been described above, the sensor nodes try to synchronize at the required precision.

Figure 19A:
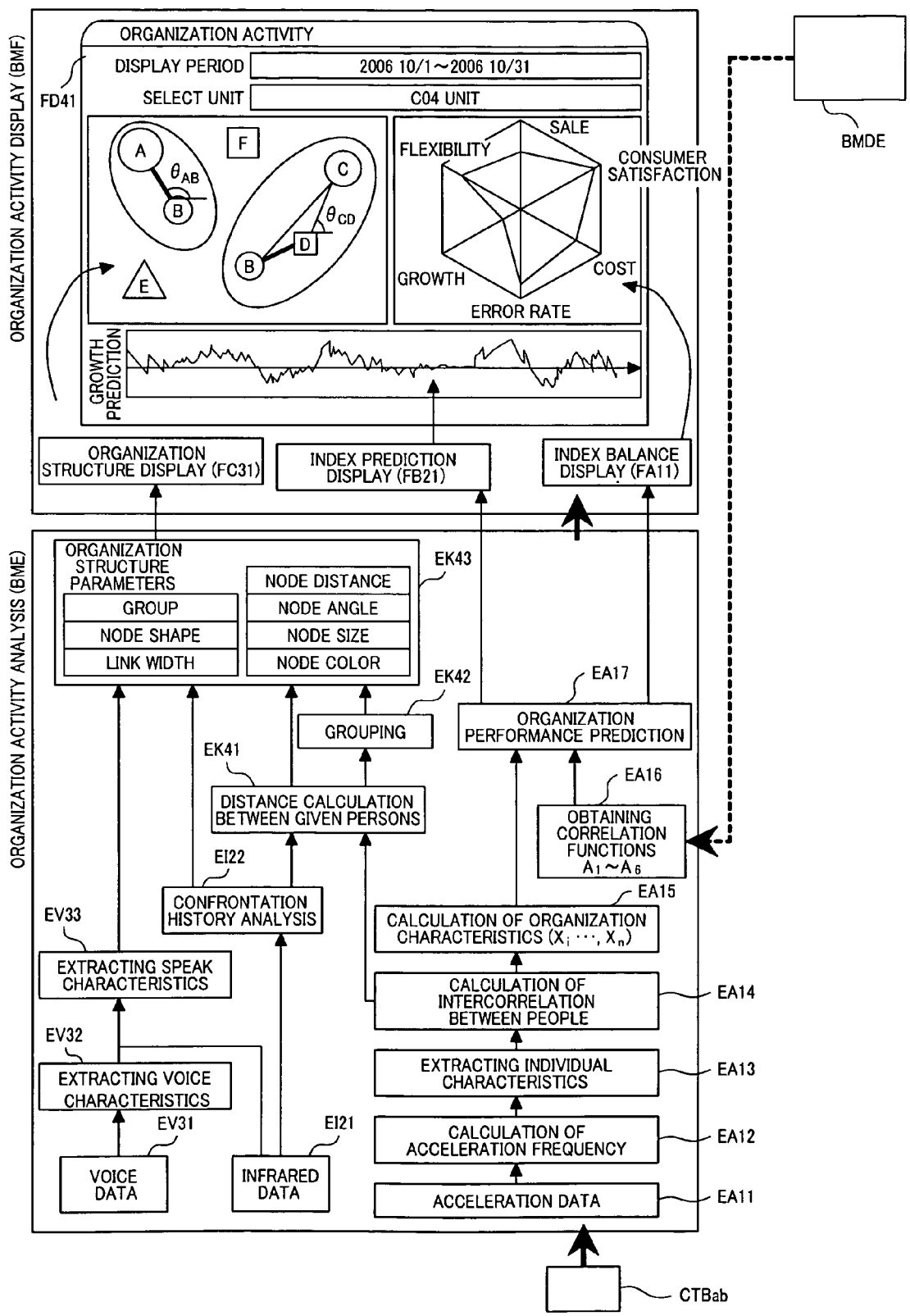
FIG. 19A illustrates an exemplary application of the sensor-Net system using the time synchronization method in accordance with the preferred embodiment of the present invention for determining the influence between persons.
Figure 19B:
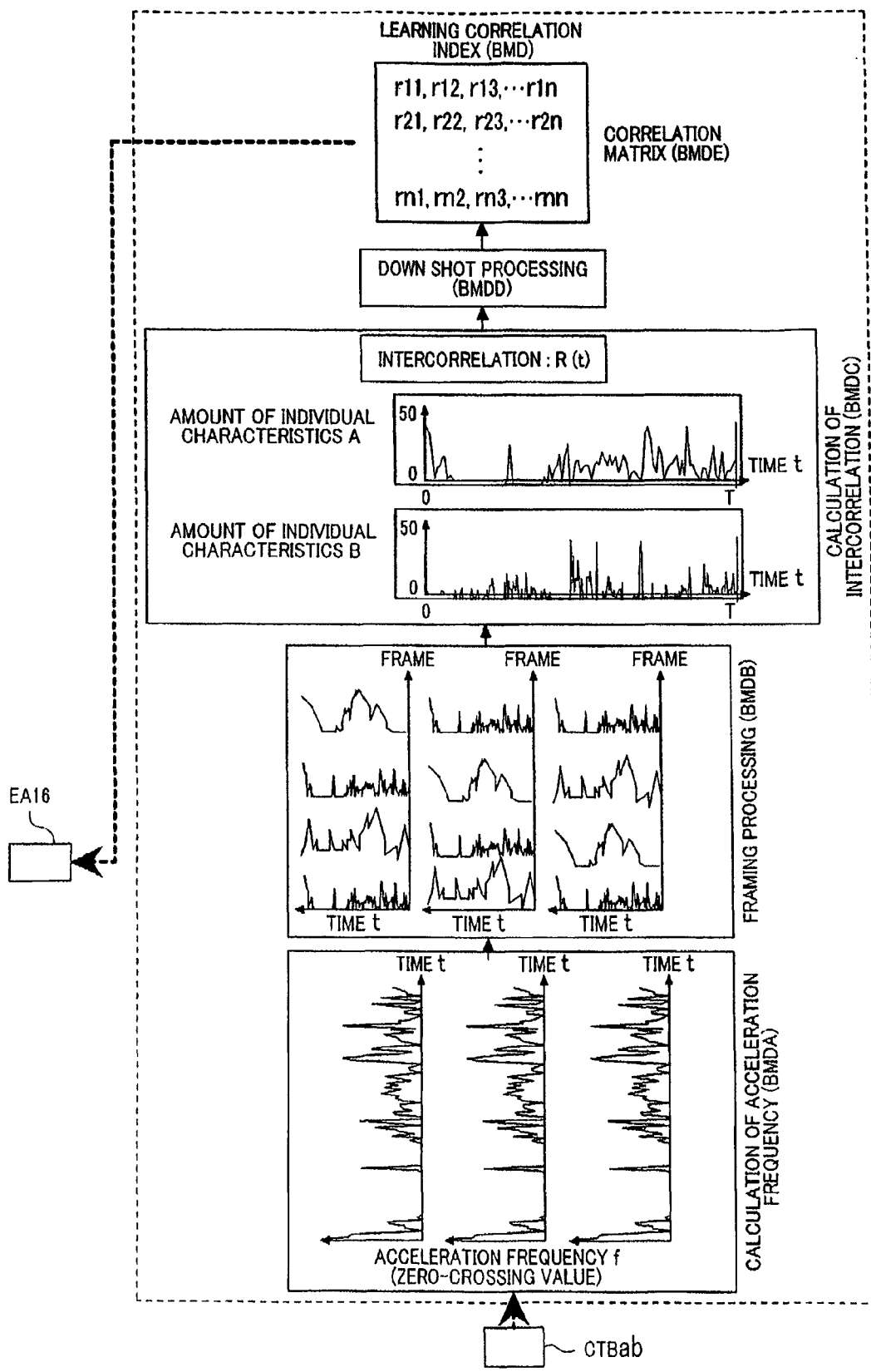
FIG. 19B illustrates an exemplary application of the sensor-Net system using the time synchronization method in accordance with the preferred embodiment of the present invention for determining the influence between persons.
Figure 19C:
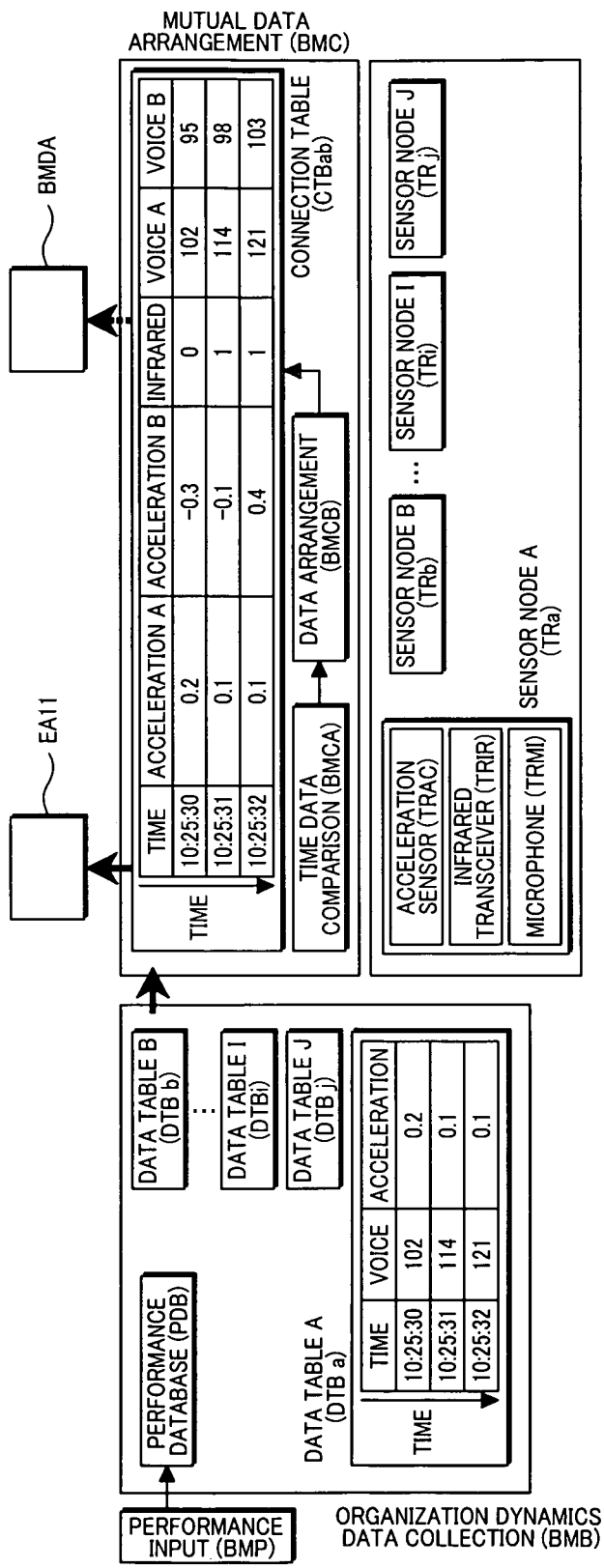
FIG. 19C illustrates an exemplary application of the sensor-Net system using the time synchronization method in accordance with the preferred embodiment of the present invention for determining the influence between persons.

Now referring to FIG. 19A, FIG. 19B, and FIG. 19C there are shown schematic diagrams illustrating the flow of process for executing the organization dynamics analysis by performing the process of determining the communication by means of the applied system.

More specifically, FIG. 19A, FIG. 19B, and FIG. 19C describe a sequential flow from obtaining the organization dynamics data by plural sensor nodes 3 to showing the connection between persons and the current organization evaluation (performance) as the organization activity.

In this embodiment the organization dynamics data obtainment (BMA), the input of performance (BMP), the organization dynamics data collection (BMB), mutual data alignment (BMC), the correlation coefficient learning (BMD), organization activity analysis (BME), and the organization activity representation (BMF) are executed in an appropriate order.

Now the organization dynamics data obtainment (BMA) will be described in greater details. The sensor node 3A (TRa) shown in FIG. 19C includes such sensors as an acceleration sensor (TRAC), an infrared transceiver (TRIR), and a microphone (TRMI), a microcomputer (not shown in the figure) and a wireless transmission function. The sensors detect a variety of physical quantities, and obtain the observation data indicating thus detected physical quantities. For example, the acceleration sensor (TRAC) detects the acceleration of the sensor node 3A (TRa), namely the acceleration of the person A (not shown in the figure) wearing the sensor node 3A (TRa). The infrared transceiver (TRIR) detects the face-to-face status of the sensor node 3A (TRa), namely the status in which the sensor node 3A (TRa) is in face to another sensor node 3. The fact that the sensor node 3A (TRa) faces with another sensor node 3 indicates that the person A wearing the sensor node 3A (TRa) is facing with another person wearing another sensor node 3. The microphone (TRMI) detects the voice around the sensor node 3A (TRa). The sensor node 3A (TRa) may also have other sensors (such as including a temperature sensor, a luminance sensor, etc.).

The applied system in this example includes plural sensor nodes 3 (more specifically the sensor node 3A (TRa) to sensor node 3J (TRj) of FIG. 19C). These sensor nodes 3 are each worn by the respective person: for example, the sensor node 3A (TRa) is worn by the person A, the sensor node 3B (TRb) by the person B (not shown in the figure), and so on. This is for analyzing the connection among the persons wearing the sensor node and for displaying the performance of the organization.

The sensor node 3B (TRb) to sensor node 3J (TRj) also include sensors, a microcomputer, and a wireless transmitter as similar to the sensor node 3A (TRa). In the following description, these sensor nodes are collectively referred to as sensor node 3 (TR) in case when the description applies to all of sensor node 3A (TRa) to sensor node 3J (TRj), and when there is no need to distinguish each sensor node 3.

Each sensor node 3 (TR) performs sensing by sensors all the time (or repeatedly at a short interval). Then each sensor node 3 (TR) transmits the obtained data (sensing data) via the wireless communication at a given interval. The interval of transmission of data may be the same as the sensing interval, or may be a larger interval than the sensing interval. The data to be sent at that time includes the time of sensing, and the intrinsic ID of the sensor node 3 (TR). The wireless transmission of the data at once is for the purpose of maintaining the extended life of the sensor node 3 (TR) as long as possible while being worn by a person, by saving the consumption of power used for the transmission. In addition, it is preferable that the same sensing interval is set in all of the sensor nodes 3 (TR) for the purpose of the following analysis.

The performance input (BMP) shown in FIG. 19C is the process of inputting the value indicating the performance. The performance herein is an objective or subjective evaluation determined based on some sort of reference. For example, the person wearing the sensor node 3 (TR) inputs at a predetermined timing a subjective evaluation (performance) value based on some sort of reference, such as the achievement of the work at that time, the contribution and satisfaction to the organization, and so on. The predetermined timing herein may be once for a few hours, once a day, or each time an event such as a conference is over. The person wearing the sensor node 3 (TR) operates the sensor node 3 (TR) or operates a personal computer (PC) such as a client (CL) to input the performance value. Or the values written by hand may be input at once later by using a PC. The input performance value is used for learning the correlation index. Once a sufficient quantity of performance values is obtained for learning at a given level, there is no need of input further values.

The performance with respect to the organization may also be calculated from the performance of individuals. The objective data including such as the sale and cost, as well as the data already digitized such as the result of a questionnaire of clients may also be input as performance at a regular interval. If the numerical data can be automatically obtained such as the error rate in the production management, thus obtained numeric values may be automatically input as the performance value.

The data transmitted via the wireless communication from the sensor node 3 (TR) is gathered by the organization dynamics data collection (BMB) shown in FIG. 19C, and stored in a database. For example, for each sensor node 3 (TR), or for each person wearing a sensor node 3 (TR), a data table is created. The collected data is classified based on the intrinsic ID, and is stored in the data table in the order of sensed time. In case that the table is not created for each sensor node 3 (TR), there must be a column indicating the ID information or the person wearing the sensor node 3 (TR) in the data table. The data table A (DTBa) in the figure describes a simplified version of an exemplary data table.

The performance value input in the performance input (BMP) is stored in the performance database (PDB) along with the time information. The data table database gathered in the organization dynamics data collection (BMB) is stored sequentially in the storage unit shown in FIG. 5.

Next, in the mutual data alignment (BMC) shown in FIG. 19C, to compare the data with respect to two given persons (in other words the data obtained by the sensor node 3 (TR) worn by these persons), the data with respect to these two persons based on the time information is aligned. The aligned data is stored in the table. In the data with respect to these two persons, the data having the same time is stored in the same record (row). The data having the same time, indicates two items of data including the physical quantities detected by two sensor nodes 3 (TR) at the same time. If the data with respect to these two persons does not include the data of the same time, the data of the nearest time may be used approximately as the data of the same time. In this case the data items of the nearest time are stored in the single same record. It is preferable that the time of the data items stored in the same record should be aligned to the mean value of the nearest time. These data items may be stored so as to be capable of comparing chronologically the data, and may not be necessarily in the table.

The connection table (CTBab) shown in FIG. 19C is a simplified expression of the exemplary table connecting the data table A (DTBa) with the data table B (DTBb). It should be noted here that the details of the data table B (DTBb) is not shown in the figure. The connection table (CTBab) includes the data of acceleration, infrared, as well as voice. However the connection table for each kind of data, for example the connection table including only the acceleration data, or the connection table including only the voice data may also be created.

Next, in the present embodiment, the learning of the correlation index (BMD) is executed for calculating the relationship from the organization dynamics data or for predicting the performance (see FIG. 19B).

The correlation index learning (BMD) is a process for determining the communication. For example, there are cases in which someone communicates with gestures such as nodding for an important speech of the other person during conversation. The action is not at random, but is taken at a given timing. The timing here is just after the speech or gesture of the other person.

From these facts, by determining the correlation of actions in the time axis of the dialogists who wear the sensor node from the sensor signals which are synchronized observation values between the sensor nodes 3, the communication between these individuals may be determined so that it is clear that the observation value data synchronized between the sensor nodes 3 is important.

One speaker 1801 wears the sensor node 3a (sensor #1) and the other speaker 1802 wears the sensor node 3b (sensor #2). In this context the gateway node 1 sends a setTime command to these two sensor nodes to synchronize with error less than for example 10 milliseconds. In FIGS. 18A to 18C, there are only two speakers, however there may be plural speakers. In such a case some combinations covering all from within all the speakers are specified and the process is executed for each combination.

Next, the process flow for the correlation learning by using the system shown in FIGS. 18A to 18C is shown in the correlation index learning (BMD) of FIG. 19B. The process is more effective if the correlation index is updated by recalculating regularly based on the new data. In the following description the correlation index is calculated from the acceleration data. The correlation index can be calculated in a similar procedure by using the time-series data such as voice data instead of the acceleration data.

In the present embodiment, the correlation index learning (BMD) shown in FIG. 19B is executed in the management server 4 described with reference to FIG. 5 and FIG. 9, more specifically in the CPU 501 thereof. However in practice the correlation index learning (BMD) may also be executed by any other device than the management server 4.

First, the management server 4 will set the width T of data used for calculation of the correlation index to a range from a few days to several weeks and will select the data within the range.

Then the management server 4 will execute the acceleration frequency calculation (BMDA). The acceleration frequency calculation (BMDA) is a process for determining the frequency from the acceleration data aligned in the time series. The frequency is defined as the number of oscillation of a wave in one second, this index indicates the intensity of the oscillation. However, to determine a precise frequency it is needed to perform a Fourier Transformation, requiring a significant amount of calculation. Although the frequency may be determined positively by using the Fourier Transform, in the present embodiment the zero-cross data is used instead, which correspond to the frequency, in order to simplify the calculation.

The zero-cross data is the number of times that the values in the time-series data for a predetermined period of time become zero, more precisely, the count of the number of times that the time-series data varies from a positive value to a negative value or from a negative value to a positive value. For example, when determining one cycle as the value of the acceleration have changed from the positive side to the negative side, then the value again have changed from the negative side to the positive side, the number of oscillations for one second can be calculated from the number of times of counted zero-crossing. The number of oscillation thus calculated for one second may be used as an approximated frequency of the acceleration.

In addition, since the sensor node 3 (TR) of the present embodiment has a triaxial acceleration sensor, one single zero-crossing value may be calculated by adding the zero-crossing values in the triaxial directions of the same period of time. This allows detecting the fine motion of pendulum in the left-right and front-back direction to use as the index indicative of the intensity of the oscillation.

A "predetermined period of time" for counting the zero-crossing data may be set to a value larger than the interval of contiguous data (i.e., the original sensing interval), in a range of seconds or minutes.

The observation values used for the analysis are preferably of the same time width in the speaker 1801 and in the speaker 1802, for example the values in a day (24 hours). The observation values are further preferably continuously or periodically substituted, and when an observation value is missing a value indicative of the absence such as NULL may be substituted therewith.

Framing (BMDB) is a process for splitting the time width of the observation values into plural uniform widths. For example, in case of the observation value time width for a day (24 hours), a frame of one hour or so is preferable. The size of the width split is referred to as frame length. As there are plural sensor signals in the input sensor signal, the timing and the width of splitting into a frame (frame length) is always the same. In addition, the span between two frames may not be necessarily needed to set to the same time of frame split. For example, in case of six minutes of interval between two frames (frame interval), the interval of 6 minutes indicates that the interval from the start time of the first frame to the start time of the next frame is six minutes.

Then, the cross-correlation calculation (BMDC) is determined for each frame of the input observation values. The cross-correlation indicates the relationship of two time varied sensor signals. The cross correlation index between two observation values may be defined as follows:

(Equation 1)

$$R(t) = \frac{1}{T'} \cdot \frac{\int_0^{T'} \{x_A(t) - \overline{x_A}\}\{x_B(t) - \overline{x_B}\}dt}{\sqrt{\int_0^{T'} \{x_A(t) - \overline{x_A}\}^2 dt} \sqrt{\int_0^{T'} \{x_B(t) - \overline{x_B}\}^2 dt}} \quad \left( \begin{array}{c} T' = T - r \\ r = -T \sim T \end{array} \right) \quad (1)$$

$x_{A(t)}$: Value of the feature $x_1$ at the time t of the person $\dfrac{A}{x_A}$:

mean value of the feature $x_1$ of the person A in the range of time from 0 to T Prior to determining the cross-correlation index, the observation values included in the frame are checked to see for improving the precision of the cross-correlation index. This is done by counting the number of two sensor signals which are not defected in the same period of time used for the process of the cross-correlation index, determining the rate of the defects, then skipping the cross-correlation index process for the frames which has a high defect rate. The threshold of the defect rate may be specified separately.

Finally, as in the cross-correlation index a number of values will be output, a value is needed which may look down upon the entire range. Then, the look down process (BMDD) is performed by determining the mean of the cross-correlation index determined for each frame in the input observation values in order to determine the correlation matrix (BMDE). Next, the correlation matrix (BMDE) is used for predicting six performances from the acceleration data.

The organization activity analysis (BME) shown in FIG. 19A is a process for determining the connection between two individuals from the acceleration, voice, face-to-face data with respect to two given individuals in the connection table, and for calculating the performance of the organization. This process also is performed by the management server 4, more specifically by the CPU 501.

The organizational performance is predicted and presented to users in real-time basis while collecting data, to for example prompt so as to change the behavior to a better direction if the prediction is worse. Briefly the feedback may be possible for a shorter cycle.

Now the calculation using the acceleration data with reference to FIG. 19A will be described in greater details. The acceleration frequency calculation (EA12), the personal feature extraction (EA13), the cross-correlation calculation between individuals (EA14), and the organizational feature calculation (EA15) use the similar procedure to the acceleration frequency calculation (BMDA), the personal feature extraction (BMDB), the cross-correlation calculation (BMDC) and the organizational feature calculation (BMDD) in the correlation index learning (BMD), and the detailed description will be omitted. By following the procedure the organizational features (x1, . . . , xm) will be calculated.

The management server 4 then obtains the organizational features (x1, . . . , xm) calculated in step EA15 and the correlational index (A1, . . . , A6) with respect to the performances calculated by the correlation index learning (BMD) (step EA16), then uses these values to calculate the index of performances, as follows:

(Equation 2)

$$p_1 = a_1 x_1 + a_2 x_2 + \ldots + a_m x_m \quad (2)$$

This value indicates the predictive value of the organization performance (EA17).

As will be described later, the latest values of six indices indicative of the organization performances are balance displayed. Further, the history of an index value is displayed in a time-series graph as the index prediction history.

The distance between the given individuals, which is determined based on the cross-correlational values between the individuals (EK41) may be used for determining the parameters for indicating the organization structure (organizational structure parameters). The distance between individuals is an index indicative of the connection between these individuals, rather than the geographical distance. For example, the stronger the interpersonal relationship is (for example, the stronger the cross-correlation between the individuals), the nearer the interpersonal distance. By executing the grouping (EK42) based on the distance between the individuals the group in the display may be defined.

The grouping is a process for creating the combinations of individuals in an intimate relation, such as creating one group of at least two individuals A and B who are specifically intimate, and another group of at least two individuals C and D who are also specifically intimate, then a large group of the combination of these individuals A, B, C, and D, and so on.

An exemplary method for determining the distance of relationship (EK41) between given individuals from the cross-correlation calculation between individuals (EA14) to display the distance will be described later (see FIG. 8).

Next, the calculation based on the infrared data will be described in greater details. The infrared data includes the information indicating when and who meets someone. The management server 4 uses the infrared data to analyze the face-to-face record (EI22). The management server 4 will then determine the parameter for displaying the organization structure based on the face-to-face history (EK43). At this time the management server 4 may calculate the distance between given individuals from the face-to-face history, in order to determine the parameters based on the distance. For example, the distance may be calculated such that the distance between the individuals becomes shorter (in other words the stronger relationship) if the number of times of meeting two individuals within a predetermined period of time is as much frequent.

For example, the management server 4 may determine the parameters so as to reflect the sum of total number of the face-to-face meeting of a person to the size of a node, the number of times of the short-term meeting of individuals to the distance between nodes, and the number of times of the long-term meeting between the given individuals to the width of the link. The node herein is a shape displayed for indicating an individual on the display (CLOD) of a client (CL). The link herein is a line displayed for connecting two nodes. The person who has met the largest number of times with someone who could be anybody will be displayed as the largest node. The combination of persons who have been met frequently recently is displayed by two closer nodes. The combination of persons who have been met for a long period of time will be displayed by two nodes connected by a thick link.

The management server 4 may also reflect the property information of a user who wears the sensor node 3 to the display of the organization structure. For example, the color of node indicative of a person may be defined based on the age of the person, the shape of the node indicative of a person may be defined based on his/her post.

Next, the calculation based on the voice data will be described in greater details. As have been described above, by using the voice data in place of the acceleration data, the cross-correlation between individuals can be calculated as similar to the calculation based on the acceleration data. The speech feature may be extracted (EV33) by extracting the voice feature from the voice data (EV32) and by analyzing the feature in combination with the face-to-face data. The speech feature is the quantity indicative of the voice tone in the conversation, the rhythm of the conversation, or the balance of speech. The balance of speech is the quantity indicating whether one of two persons speaks in the one-sided manner, or whether both of them speak evenly, and the quantity is extracted based on the voice of two individuals.

For example, the management server 4 may determine the display parameter such that the speech balance is reflected to the angle between nodes. More specifically, for example, when two individuals speak evenly, the nodes indicative of these two individuals may be displayed horizontally. In case in which one of them speaks in one-way, the node indicative of the person who is speaking may be displayed above the other node indicative of the other person. If the tendency that one of them speaks in the one-way fashion is much intensive, the angle between the line connecting these nodes indicative of two persons and the reference line (in the organization structure display (FC31) shown in FIG. 19A, the angle theta AB or theta CD) may be displayed larger. The reference line herein is the line set in the lateral direction of the display (i.e., in the horizontal direction). The reference line may or may not be displayed.

The organization activity display (BMF) is a process which creates, from the organization performance prediction and the organization structure parameters as calculated by the process as have been described above, the index balance indication (FA11), index forecast record (FB21), the representation of organization structure (FC31) and the like, then displays on the display (CLOD) of the client (CL).

The organization activity (FD41) shown in FIG. 19A is an exemplary screen displayed on the display (CLOD) of the client (CL).

In the example shown in FIG. 19A, the display period of time selected, and the units or plural members to be displayed are initially displayed. The unit herein is an organization composed of plural persons. All members belonging to one unit may be displayed, or plural members constituting a part of a unit may be displayed. In the example shown in FIG. 19A the result of analysis based on the condition indicated by the period of time of display and the unit is displayed by three figures.

In the figure of the index forecast record (FB21), the record of the forecast result of the performance in the "growth" is displayed as an example. This allows analyzing, by checking with the past action history, what kind of action of a member contributes to the growth of the organization, and additionally what is effective for the conversion from negative to positive result.

In the organization structure display (FC31), the situation of a small group constituting the organization, the role substantially played by the persons in the organization, and the balance between given individuals may be visualized.

The index balance indication (FA11) indicates the balance configured for set six organization performance prediction. This allows assessing the advantages and the disadvantages of the current organization.

Embodiment 3

Now the sensor-Net system using the time synchronization scheme in accordance with a third preferred embodiment of the present invention will be described in greater details.

Now referring to FIG. 20, there is shown an applied system for detecting the focus 2001 of an earthquake by using the sensor-Net system. For specifying the focus of an earthquake the grid search method (see for example non-patent reference document #2) may be used. For specifying the location of the focus of earthquake with the precision of less than 100 meters by means of the grid search method, more than three sensor nodes are required, each of which has an acceleration sensor or a vibration sensor, these sensor nodes are to be placed at the distance of 100 meters, and the time synchronization must be done at the precision of 20 milliseconds.

Figure 21:
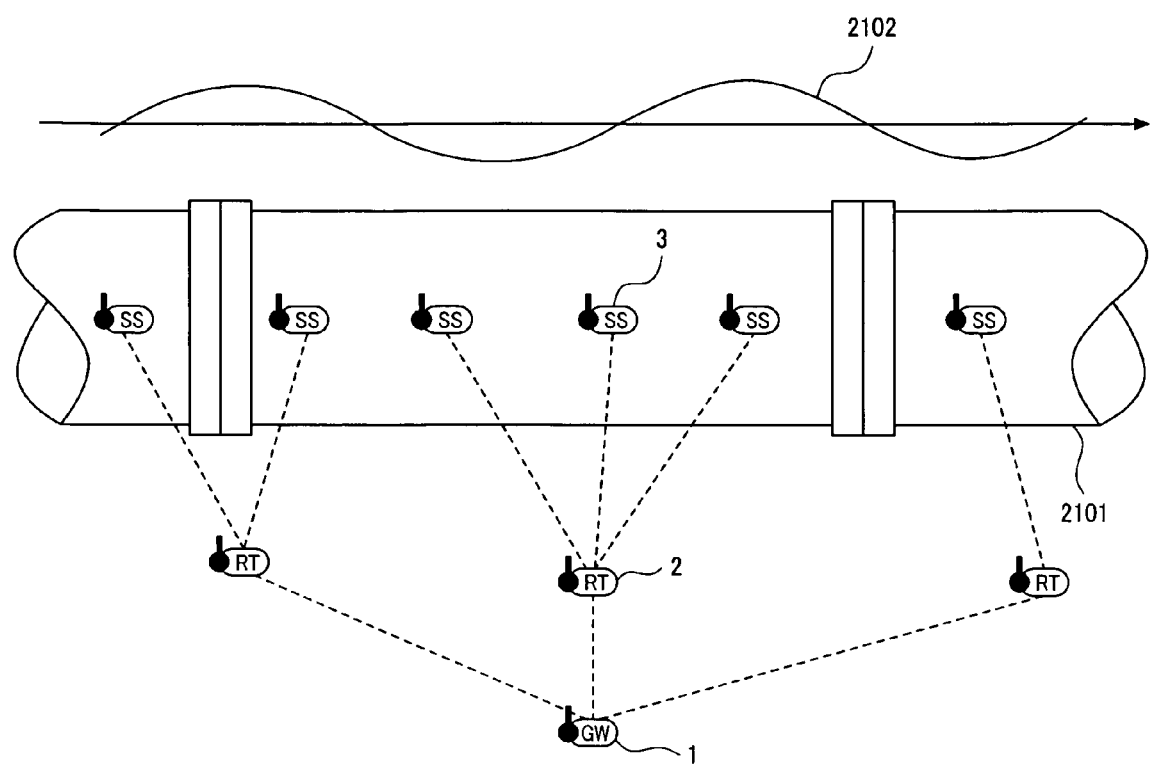
FIG. 21 shows a system configuration diagram of the sensor-Net system illustrating an exemplary application of the sensor-Net system using the time synchronization method in accordance with the preferred embodiment of the present invention for observing the vibration of piping.

Now referring to FIG. 21 there is shown a system for observing the vibration of piping by using the sensor-Net system. The phase difference of the waveform 2102 conducted along with the piping 2101 is calculated by using the sensor-Net system, in order to detect the position of the pressure node and the pressure antinode. This allows specifying the location of generating the waveform or calculating the stress applied. To achieve this, it is needed to detect the phase difference of waveform conducting along with the piping at 200 Hz, requiring accordingly the time synchronization of the sensor nodes at the precision of a few milliseconds.

The time synchronization method in accordance with the third preferred embodiment of the present invention for achieving the time synchronization precision in such a system will be described in greater details herein below.

Figure 22:
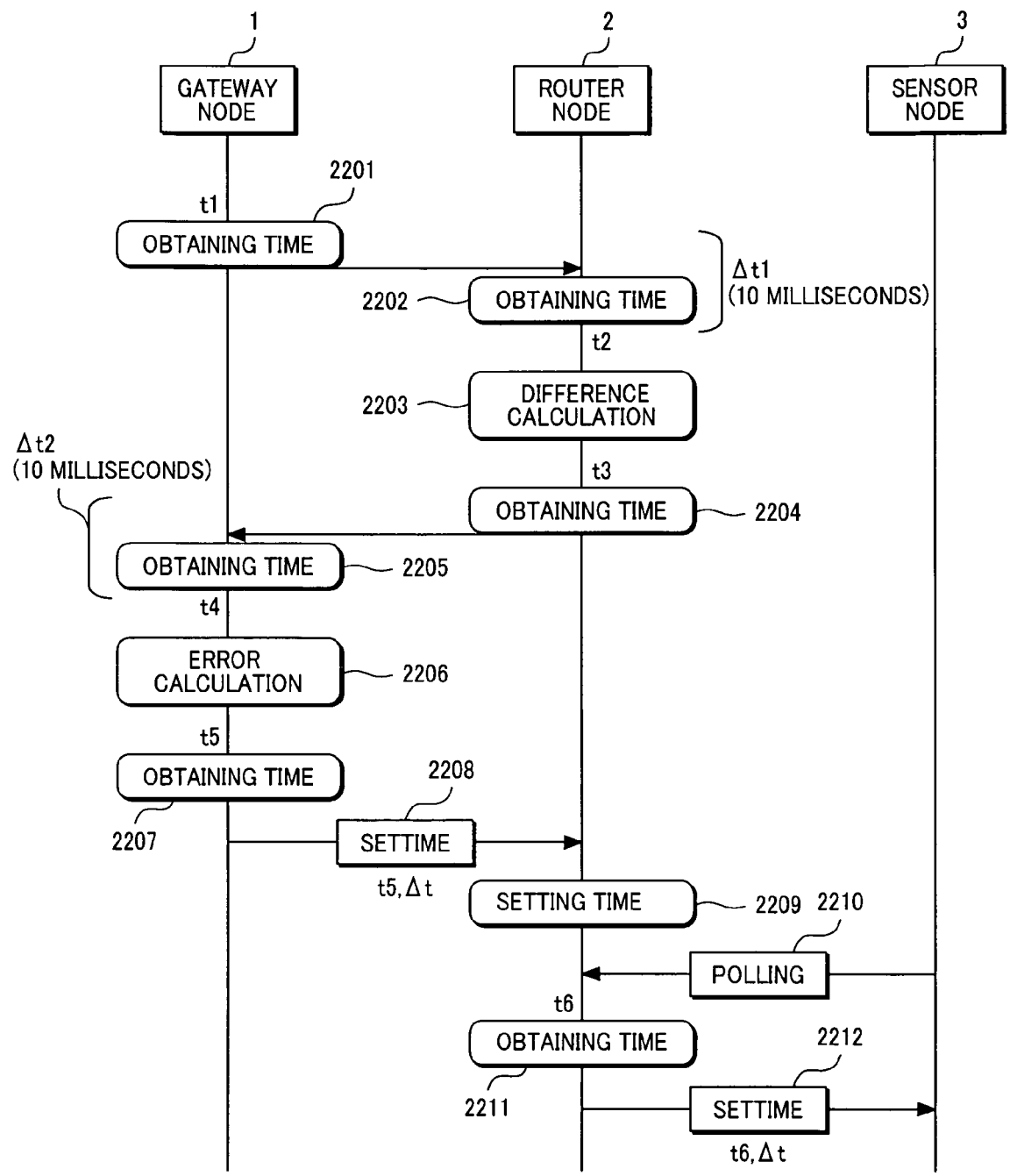
FIG. 22 shows a time setting sequence diagram in accordance with third preferred embodiment of the present invention.

Now referring to FIG. 22 there is shown a schematic sequential diagram illustrating the time synchronization method in accordance with the third preferred embodiment of the present invention for decreasing the error of time when the sensor node 3 is connected to the gateway node 1 through the router node 2 in a multi-hop connection.

The gateway node obtains the time t1 from its own real time clock 406 (2201), and transmits t1 to the router node. The router, upon reception of the time t1, obtains immediately the time t2 from its own real time clock 306 (2202), to calculate the difference between t2 and t1 ($\Delta T1 = t2*t1$) (2203). Next, the router obtains the time t3 from its own real time clock 306 (2204), and transmits the $\Delta T1$ and t3 to the gateway node. The gateway node which has received the $\Delta T1$ and t3 obtains immediately the time t4 from its own real time clock 406 (2205), then uses $\Delta T1$, t3 and t4 to calculate the delay ($2*\Delta t = t4-t3+\Delta T1$) (2206). Thus calculated $\Delta t$ is the delay at the time of setting the time in the gateway node and in the router. If the delay (t varies each time it is measured, the precision may be improved by calculating the mean of (t by measuring plural times. If a router is connected to another router, the delay may also be calculated between these routers.

Next, the base station gateway node obtains the time from its own real time clock 406 regularly or at the timing specified by the user (2207), to send a setTime command (2208). At this time the current time t5 obtained from its own real time clock 406 and the delay (t are sent at the same time in a setTime command. The router node which receives this setTime command uses the difference between the time t5 included in the setTime command and the delay (t(T2=t5−(t) to set or correct its own real time clock (2209). At the time of receiving the polling (2210) from the sensor node the router obtains the time t6 from the real time clock of the router (2211) and sends the time t6 and the delay (t as the setTime command (2212). The sensor node which receives the setTime command uses the difference between the time t6 and the delay (t(T3=t6−(t) to set or correct its own real time clock.

The primary cause of the delay in this method is the processing time from the time when the firmware of the base station gateway node and the router obtain the time from the real time clock to the time when transmitting through their RF transceiver, and the processing time from the time when receiving at the RF transceiver to the time when obtaining the time from the real time clock, and in case in which no interrupt is included the delay will be at the level of tens milliseconds. The same circuit is used for the real time clock, the microprocessor, and the RF transceiver in the base station gateway node, the router, and the sensor node. Therefore the delay between the router and the sensor node can be considered to be almost the same as the delay between the base station gateway node and the router.

If there are plural routers connected to a base station gateway node, the dispersion of the delay caused by the individual variability will be decreased by calculating the delay (t between the base station gateway node and all routers and by calculating the mean value.

If the data transmission is failed on the wireless medium, the transmission will be repeated at the transmission interval of a few milliseconds at most three times. The error in the present method therefore is the error caused by the wireless retransmission, which is in the range of a few milliseconds to 10 milliseconds.

The sensor-Net in a meshed type multi-hop has the advantage that the communication path can be freely selected. By using this, the time configuration is performed by avoiding the path having a larger delay to improve the time precision. More specifically, the router stores the delay (t to calculate the variance ((t of the (t each time the router receives a setTime command. The ((t can be considered to as the communication cost. To configure the time, the time is set by using preferentially the path having a lower ((t in order to achieve a high precision time configuration.

As can be appreciated from the foregoing description, in accordance with the preferred embodiments of the present invention, as the sensor node may set the time while maintaining its intermittent operation, and the time is set only when the time in the router is synchronized with the reference time, the deviation of the time may be suppressed to the minimum while at the same time any waste waiting time is saved, as a result the power consumption can be lowered and more specifically when the sensor node is powered by a battery the life of the battery can be extended.

Effect of the Invention

In accordance with the present invention, the power consumption in the sensor-Net system may be saved, more specifically the battery life is extended if the sensor node is battery-operated.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments are chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

It is further understood by those skilled in the art that the foregoing description is some preferred embodiments of the disclosed system and method and that various changes and modifications may be made in the invention without departing from the spirit and scope thereof.

What is claimed is:

1. A sensor-Net system, comprising a base station gateway node, a router node connected to the base station gateway node in a wireless communication, and a first sensor node of a plurality of sibling sensor nodes connected to the base station gateway node and to the router node in a wireless communication, the base station gateway node and the router node being in continuous operation, the first sensor node intermittently activating to an operation mode and then deactivating to a sleep mode for a predetermined sleep time period, wherein the router node has a storage unit for storing a respective time configuration flag for each corresponding to each of the sibling sensor nodes;

wherein the router node, upon receiving a first time setting command from the gateway node, at a timing of setting a latest time of the router node, turns on the respective time configuration flags held in the storage unit;

wherein the first sensor node issues a command transmission request to the router node while activated to the operation mode prior to a next deactivation to the sleep mode;

wherein the router node, upon reception of the command transmission request from the first sensor node, checks to see the ON or OFF status of the time configuration flag of the first sensor node, and obtains the latest time of the router node, transmits, only when the time configuration flag is ON, the time setting command based on the latest time of the router node to the first sensor node having transmitted the command transmission request in the operation mode;

wherein the sensor node in the operation mode sets an internal lime based on the time setting command from the router node, adds a time stamp to an observation value based on the internal time, and then transmits the observation value to the router node; and wherein the router node turns off the time configuration flag held in the storage unit at the timing of receiving a reply to the time setting command; and wherein a processing unit of a management server connected to the gateway node calculates an influence between a first wearer wearing one sensor node and a second wearer wearing another sensor node, the influence is calculated based on a correlation determined between a first observation value transmitted by the sensor node worn by the first wearer and a second observation value transmitted by the sensor node worn by the second wearer that are both stored in an observation value storage unit of the management server.

2. A sensor-Net system according to claim 1, wherein the gateway node has a plurality of sibling router nodes, and has a management table for managing the sibling router nodes and the sibling sensor nodes; and the gateway node, upon reception of the time setting command from a management server connected through a network, refers to the management table to expand immediately the time setting command to the sibling router nodes to synchronize the time in the sibling router nodes.

3. A sensor-Net system according to claim 1, wherein the first sensor node, after having sent the observation value to the router node, stores the observation value having the latest time added into the storage unit of the first sensor node, then enters into sleep mode of the intermittent operation.

4. A sensor-Net system according to claim 1, wherein the a management server is connected to the gateway node through a network and includes a communication unit for connecting to the network
wherein the management server receives the observation value received by the router node through the gateway node for storing in the observation value storage unit.

5. A sensor-Net system according to claim 1, wherein the sensor nodes worn by the first and second wearer have respective acceleration sensors;
the sensor nodes worn by the first and second wearer transmit output data of the respective acceleration sensors as the first and second observation values; and
the processing unit of the management server determines a correlation of action between the first and second wearers based on the output data of the respective acceleration sensor in order to calculate the influence.

6. A sensor-Net system according to claim 1, wherein the router node, upon reception of the command transmission request from the first sensor node, transmits a command present, and transmits the latest time of the router node as the second time setting command.

7. A sensor-Net system according to claim 1, wherein the first sensor node, upon reception of the command present from the router node, waits for a time period in a stand-by state, and corrects the internal time based on the latest time of the router node received as the second time setting command.

8. A sensor-Net system, comprising a gateway node, and a first sensor node of a plurality of sensor nodes connected to the gateway node through a wireless communication, the gateway node being in continuous operation, the first sensor node intermittently activating to an operation mode and then deactivating to a sleep mode for a predetermined sleep time period,
wherein the first sensor node issues a time request command to the gateway node on a regular basis or upon connecting to the gateway node while activated to the operation mode prior to a next deactivation to the sleep mode, invokes an internal timer upon receiving a reply to the time request command from the gateway node, and transmits a polling request to the gateway node upon being activated to the operation mode following the next deactivation to the sleep mode;
wherein the gateway node transmits the reply to the time request command to the first sensor node and obtains a reference time upon receiving the time request command from the first sensor node, and transmits the reference time to the first sensor node upon receiving the polling command from the first sensor node;
wherein the first sensor node Stops the internal timer upon receiving the reference time, calculates an active time of the internal timer as a time difference between when the internal timer was invoked and when the internal timer was stopped, and then determines a current time by adding the active time of the internal timer to the reference time received from the gateway node,
wherein the first sensor node sets an internal time to the current time, adds a time stamp to an observation value based on the internal time, and then transmits the observation value to the gateway node; and
wherein a processing unit of a management server connected to the gateway node calculates an influence between a first wearer wearing one sensor node and a second wearer wearing another sensor node, the influence is calculated based on a correlation determined between a first observation value transmitted by the sensor node worn by the first wearer and a second observation value transmitted by the sensor node worn by the second wearer that are both stored in an observation value storage unit of the management server.

9. A sensor-Net system according to claim 8, wherein the management server is connected to the gateway node through a network and includes a communication unit for connecting to the network; and
wherein the management server receives the observation value received by the gateway node from the first sensor node for storage in the storage unit.

10. A sensor node connected through a wireless communication to a gateway node being in continuous operation, the sensor node being in intermittent operation, comprising:
a processing unit, a storage unit, an RF transceiver unit, and a real time clock, wherein the processing unit issues a time request command to the gateway node on a regular basis or upon connecting to the gateway node while activated to an operation mode prior to a next deactivation to a sleep mode, invokes an internal timer upon receiving a reply to the time request command from the gateway node, and, upon being activated to the operation mode following the next deactivation to the sleep mode, transmits a polling request to the gateway node and receives a reference time transmitted by the gateway node, the reference time being obtained by the gateway node upon receiving the time request command from the sensor node; and wherein the sensor node stops the internal timer upon receiving the reference time, calculates an active time of the internal timer as a time difference between when the internal timer was invoked and when the internal timer was stopped, and then determines a current time by adding the active time of the internal timer to the reference time received from the gateway node, sets an internal time to the current time, adds a time stamp to an observation value based on the internal time, and then transmits the observation value to the gateway node; and
wherein a management server connected to the gateway node calculates an influence between a first wearer wearing one sensor node and a second wearer wearing another sensor node, the influence is calculated based on a correlation determined between a first observation values transmitted by the sensor node worn by the first wearer and a second observation value transmitted by the sensor node worn by the second wearer that are both stored in an observation value storage unit of the management server.

11. A sensor node according to claim 10, wherein the processing unit is a microprocessor incorporating a timer which is operable in a low power consumption mode; and
the timer incorporated in the microprocessor is used as the internal timer to calculate the active time.

* * * * *